(12) United States Patent
Furihata et al.

(10) Patent No.: US 11,874,292 B2
(45) Date of Patent: Jan. 16, 2024

(54) VIBRATION DIAGNOSTIC METHOD FOR A BUILDING FLOOR USING AN INERTIAL SENSOR, VIBRATION DIAGNOSTIC SYSTEM, AND DISPLAY METHOD

(71) Applicant: Seiko Epson Corporation, Tokyo (JP)

(72) Inventors: Koji Furihata, Matsumoto (JP); Shinya Nagai, Nagano (JP); Shuichi Iguchi, Ina (JP); Makoto Sakurai, Okaya (JP)

(73) Assignee: SEIKO EPSON CORPORATION

( * ) Notice: Subject to any disclaimer, the term of this patent is extended or adjusted under 35 U.S.C. 154(b) by 70 days.

(21) Appl. No.: 17/511,636

(22) Filed: Oct. 27, 2021

(65) Prior Publication Data

US 2022/0128589 A1 Apr. 28, 2022

(30) Foreign Application Priority Data

Oct. 28, 2020 (JP) ................. 2020-180477

(51) Int. Cl.
*G01P 15/08* (2006.01)
*G06T 11/20* (2006.01)

(52) U.S. Cl.
CPC ............ *G01P 15/08* (2013.01); *G06T 11/206* (2013.01)

(58) Field of Classification Search
CPC .......... G01P 15/08; G06T 11/206; G01H 1/00
See application file for complete search history.

(56) References Cited

U.S. PATENT DOCUMENTS

| | | | | |
|---|---|---|---|---|
| 4,520,674 A | * | 6/1985 | Canada | ............... G01H 1/00 702/56 |
| 10,612,964 B1 | * | 4/2020 | Shi | ............... G01G 19/42 |
| 2002/0104950 A1 | | 8/2002 | Mayama | |
| 2003/0057346 A1 | | 3/2003 | Wakui | |
| 2010/0001445 A1 | * | 1/2010 | Maruyama | ......... F16F 15/0275 267/113 |
| 2014/0355384 A1 | * | 12/2014 | Workman | ............... G01H 1/00 367/93 |

FOREIGN PATENT DOCUMENTS

| | | |
|---|---|---|
| JP | 2002-089619 A | 3/2002 |
| JP | 2002-221249 A | 8/2002 |
| JP | 2003-232398 A | 8/2003 |

* cited by examiner

*Primary Examiner* — Natalie Huls
*Assistant Examiner* — Cynthia L Davis
(74) *Attorney, Agent, or Firm* — Harness, Dickey & Pierce, P.L.C.

(57) ABSTRACT

A diagnostic method includes the following steps. A step of detecting values of an acceleration of a vibration of a building floor. A step of calculating vibration information related to the vibration of the building floor based on a detection signal. The vibration information includes frequencies and magnitudes of the vibration. A step of performing a vibration diagnosis of a structural body of a diagnosis model based on the first vibration information, an index related to a vibration of the structural body, and information on a display device. The index is a standard of the vibration allowed for the structural body. The displayed information identifies a plurality of supports that are candidates for a first support installed between the building floor and the structural body. A step of outputting a first diagnosis result of the vibration diagnosis to the display device.

12 Claims, 32 Drawing Sheets

| | | INDEX RELATED TO VIBRATION OF STRUCTURAL BODY | | | |
|---|---|---|---|---|---|
| | | St1 | St2 | St3 | St4 |
| VIBRATION LEVEL | Lv1 | STIFF SUPPORT 1 TO 3 | STIFF SUPPORT 4 TO 6 | STIFF SUPPORT 7 TO 9 | STIFF SUPPORT 10 TO 12 |
| | Lv2 | | | | |
| | Lv3 | STIFF SUPPORT 13 TO 15 | STIFF SUPPORT 16 TO 18 | STIFF SUPPORT 19 TO 21 | STIFF SUPPORT 22 TO 24 |
| | Lv4 | | | | |
| | Lv5 | STIFF SUPPORT 25 TO 27 | STIFF SUPPORT 28 TO 30 | STIFF SUPPORT 31 TO 33 | STIFF SUPPORT 34 TO 36 |
| | Lv6 | | | | |
| | Lv7 | STIFF SUPPORT 37 TO 39 | STIFF SUPPORT 40 TO 42 | STIFF SUPPORT 43 TO 45 | STIFF SUPPORT 46 TO 48 |
| | Lv8 | | | | |
| | Lv9 | STIFF SUPPORT 49 TO 51 | STIFF SUPPORT 52 TO 54 | STIFF SUPPORT 55 TO 57 | STIFF SUPPORT 58 TO 60 |
| | Lv10 | | | | |

| | | INDEX RELATED TO VIBRATION OF STRUCTURAL BODY | | | |
|---|---|---|---|---|---|
| | | St1 | St2 | St3 | St4 |
| VIBRATION LEVEL | Lv1 | VIBRATION ISOLATION FRAME 1 TO 3 | VIBRATION ISOLATION FRAME 4 TO 6 | VIBRATION ISOLATION FRAME 7 TO 9 | VIBRATION ISOLATION FRAME 10 TO 12 |
| | Lv2 | | | | |
| | Lv3 | VIBRATION ISOLATION FRAME 13 TO 15 | VIBRATION ISOLATION FRAME 16 TO 18 | VIBRATION ISOLATION FRAME 19 TO 21 | VIBRATION ISOLATION FRAME 22 TO 24 |
| | Lv4 | | | | |
| | Lv5 | VIBRATION ISOLATION FRAME 25 TO 27 | VIBRATION ISOLATION FRAME 28 TO 30 | VIBRATION ISOLATION FRAME 31 TO 33 | VIBRATION ISOLATION FRAME 34 TO 36 |
| | Lv6 | | | | |
| | Lv7 | VIBRATION ISOLATION FRAME 37 TO 39 | VIBRATION ISOLATION FRAME 40 TO 42 | VIBRATION ISOLATION FRAME 43 TO 45 | VIBRATION ISOLATION FRAME 46 TO 48 |
| | Lv8 | | | | |
| | Lv9 | VIBRATION ISOLATION FRAME 49 TO 51 | VIBRATION ISOLATION FRAME 52 TO 54 | VIBRATION ISOLATION FRAME 55 TO 57 | VIBRATION ISOLATION FRAME 58 TO 60 |
| | Lv10 | | | | |

| | | INDEX RELATED TO VIBRATION OF STRUCTURAL BODY | | | |
|---|---|---|---|---|---|
| | | St1 | St2 | St3 | St4 |
| VIBRATION LEVEL OF FLOOR | Lv1 | STIFF SUPPORT 1 TO 3 | STIFF SUPPORT 4 TO 6 | STIFF SUPPORT 7 TO 9 | STIFF SUPPORT 10 TO 12 |
| | Lv2 | | | | |
| | Lv3 | STIFF SUPPORT 13 TO 15 | STIFF SUPPORT 16 TO 18 | STIFF SUPPORT 19 TO 21 | STIFF SUPPORT 22 TO 24 |
| | Lv4 | | | | |
| | Lv5 | STIFF SUPPORT 25 TO 27 | STIFF SUPPORT 28 TO 30 | STIFF SUPPORT 31 TO 33 | STIFF SUPPORT 34 TO 36 |
| | Lv6 | | | | |
| | Lv7 | STIFF SUPPORT 37 TO 39 | STIFF SUPPORT 40 TO 42 | STIFF SUPPORT 43 TO 45 | STIFF SUPPORT 46 TO 48 |
| | Lv8 | | | | |
| | Lv9 | STIFF SUPPORT 49 TO 51 | STIFF SUPPORT 52 TO 54 | STIFF SUPPORT 55 TO 57 | STIFF SUPPORT 58 TO 60 |
| | Lv10 | | | | |

FIG. 32

| | | INDEX RELATED TO VIBRATION OF STRUCTURAL BODY | | | |
|---|---|---|---|---|---|
| | | St1 | St2 | St3 | St4 |
| VIBRATION LEVEL OF FLOOR AND STIFF SUPPORT | Lv1 | VIBRATION ISOLATION FRAME 1 TO 3 | VIBRATION ISOLATION FRAME 4 TO 6 | VIBRATION ISOLATION FRAME 7 TO 9 | VIBRATION ISOLATION FRAME 10 TO 12 |
| | Lv2 | | | | |
| | Lv3 | VIBRATION ISOLATION FRAME 13 TO 15 | VIBRATION ISOLATION FRAME 16 TO 18 | VIBRATION ISOLATION FRAME 19 TO 21 | VIBRATION ISOLATION FRAME 22 TO 24 |
| | Lv4 | | | | |
| | Lv5 | VIBRATION ISOLATION FRAME 25 TO 27 | VIBRATION ISOLATION FRAME 28 TO 30 | VIBRATION ISOLATION FRAME 31 TO 33 | VIBRATION ISOLATION FRAME 34 TO 36 |
| | Lv6 | | | | |
| | Lv7 | VIBRATION ISOLATION FRAME 37 TO 39 | VIBRATION ISOLATION FRAME 40 TO 42 | VIBRATION ISOLATION FRAME 43 TO 45 | VIBRATION ISOLATION FRAME 46 TO 48 |
| | Lv8 | | | | |
| | Lv9 | VIBRATION ISOLATION FRAME 49 TO 51 | VIBRATION ISOLATION FRAME 52 TO 54 | VIBRATION ISOLATION FRAME 55 TO 57 | VIBRATION ISOLATION FRAME 58 TO 60 |
| | Lv10 | | | | |

VIBRATION DIAGNOSTIC METHOD FOR A BUILDING FLOOR USING AN INERTIAL SENSOR, VIBRATION DIAGNOSTIC SYSTEM, AND DISPLAY METHOD

The present application is based on, and claims priority from JP Application Serial Number 2020-180477, filed Oct. 28, 2020, the disclosure of which is hereby incorporated by reference herein in its entirety.

BACKGROUND

1. Technical Field

The present disclosure relates to a diagnostic method, a diagnostic system, and a display method.

2. Related Art

JP-A-2002-221249 discloses an active vibration damping unit suitable for realizing favorable performance of a semiconductor exposure apparatus by performing stable and quick vibration damping of vibrations such as stiff body vibrations and structural resonances generated in a structural body constituting the semiconductor exposure apparatus or the like.

However, when an appropriate vibration damping device suitable for conditions in which structural bodies such as various devices are arranged is not installed, the vibration transferred to the structural body may not be sufficiently reduced. Thus, it is desired to provide information for causing a user to determine whether or not the vibration to be transferred to a structural body may be sufficiently reduced before the structural body is put into operation.

SUMMARY

An aspect of a diagnostic method according to the present disclosure includes calculating first vibration information related to a vibration of a floor based on a detection signal obtained by detection of an inertial sensor disposed on the floor, generating a first diagnosis result related to vibration damping on a structural body when a first support is installed between the floor and the structural body, based on the first support selected based on the calculated first vibration information, an index related to a vibration of the structural body, and information displayed on a display device, and outputting the generated first diagnosis result to the display device. An aspect of a diagnostic method according to the present disclosure includes calculating first vibration information related to a vibration of an installation location based on the detection signal detected by an inertial sensor disposed at an installation location and generating a first diagnostic result based on a first support selected from candidates, and the first vibration information. The first diagnostic result is related to vibration damping on a structural body when the first support is installed between the installation location and the structural body.

An aspect of a diagnostic system according to the present disclosure includes a diagnostic device, and a display device. The diagnostic device includes a first vibration information calculation unit that calculates first vibration information related to a vibration of a floor based on a detection signal obtained by detection of an inertial sensor disposed on the floor, a first diagnosis result generation unit that generates a first diagnosis result related to vibration damping on a structural body when a first support is installed between the floor and the structural body, based on the first support selected based on the calculated first vibration information, an index related to a vibration of the structural body, and information displayed on the display device, and an output unit that outputs the generated first diagnosis result to the display device. The display device displays the first diagnosis result.

An aspect of a display method according to the present disclosure includes displaying information for selecting a first support, and displaying a first diagnosis result related to vibration damping on a structural body when the first support is installed between a floor and the structural body, the first diagnosis result being generated based on the first support selected based on first vibration information related to a vibration of the floor calculated based on a detection signal obtained by detection of an inertial sensor disposed on the floor, an index related to a vibration of the structural body, and the information.

BRIEF DESCRIPTION OF THE DRAWINGS

FIG. 27 is a diagram illustrating an example of a stiff support selection table.

FIG. 28 is a diagram illustrating an example of a vibration isolation frame selection table.

FIG. 31 is a diagram illustrating an update example of the stiff support selection table.

FIG. 32 is a diagram illustrating an update example of the vibration isolation frame selection table.

DESCRIPTION OF EXEMPLARY EMBODIMENTS

Hereinafter, preferred embodiments of the present disclosure will be described in detail with reference to the drawings. The embodiments described below do not unreasonably limit the content of the present disclosure described in the appended claims. Not all of the configurations described below are essential constituent requirements of the present disclosure.

1. First Embodiment 1-1. Configuration of Diagnostic System

Figure 1:
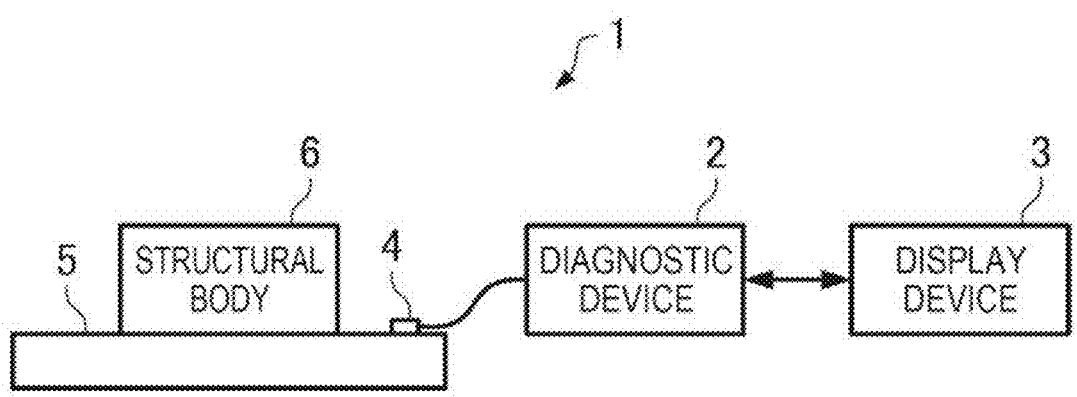
FIG. 1 is a diagram illustrating a configuration example of a diagnostic system.
Figure 2:
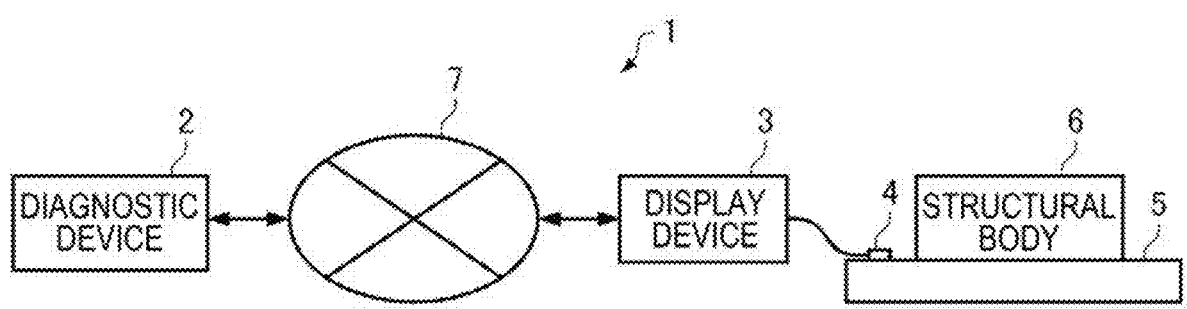
FIG. 2 is a diagram illustrating another configuration example of the diagnostic system.

FIG. 1 is a diagram illustrating a configuration example of a diagnostic system in the present embodiment. FIG. 2 is a diagram illustrating another configuration example of the diagnostic system in the present embodiment.

As illustrated in FIGS. 1 and 2, a diagnostic system 1 includes a diagnostic device 2 and a display device 3. In the example of FIG. 1, for example, the diagnostic device 2 may be the main body of a personal computer, and the display device 3 may be a display of the personal computer. In the examples of FIGS. 1 and 2, the diagnostic device 2 and the display device 3 may be separate personal computers.

The diagnostic device 2 acquires a detection signal obtained by detection of an inertial sensor 4 disposed on a floor 5 on which a structural body 6 such as a predetermined device is installed, and calculates first vibration information being information related to the vibration of the floor 5, based on the acquired detection signal.

As in the example of FIG. 1, the diagnostic device 2 may be coupled to the inertial sensor 4 to acquire the detection signal from the inertial sensor 4. As in the example of FIG. 2, the display device 3 may be coupled to the inertial sensor 4 to acquire the detection signal from the inertial sensor 4, and the diagnostic device 2 may acquire the detection signal from the display device 3 via a network 7 such as a local area network or the Internet. In the examples of FIGS. 1 and 2, a device different from the diagnostic device 2 and the display device 3 may acquire the detection signal from the inertial sensor 4, and write data of the acquired detection signal into a file stored in a storage medium, and the diagnostic device 2 may acquire the file.

For example, the inertial sensor 4 may be an acceleration sensor, and the detection signal may be an acceleration detection signal. The inertial sensor 4 may be an angular velocity sensor, and the detection signal may be an angular velocity detection signal. The inertial sensor 4 may be an inertial measurement unit including an acceleration sensor and an angular velocity sensor, and the detection signal may be a detection signal of an acceleration and an angular velocity. The detection axis of the inertial sensor 4 may be one axis or two or more axes.

The first vibration information may be information indicating the frequency and the magnitude of a vibration on the floor 5. For example, when the detection signal is an acceleration detection signal, the detection signal may be information indicating the frequency of a vibration and the magnitude of an acceleration caused by the vibration, or information indicating the frequency of the vibration and the magnitude of a velocity caused by the vibration.

A user of the diagnostic system 1 selects a first support to be installed between the floor 5 and the structural body 6, based on information displayed on the display device 3. The information displayed on the display device 3 may be, for example, information such as the names and model numbers of a plurality of supports as candidates for the first support. The support may be, for example, a stiff support or a vibration isolation frame. The vibration isolation frame may be a passive vibration isolation frame or an active vibration isolation frame.

Figure 3:
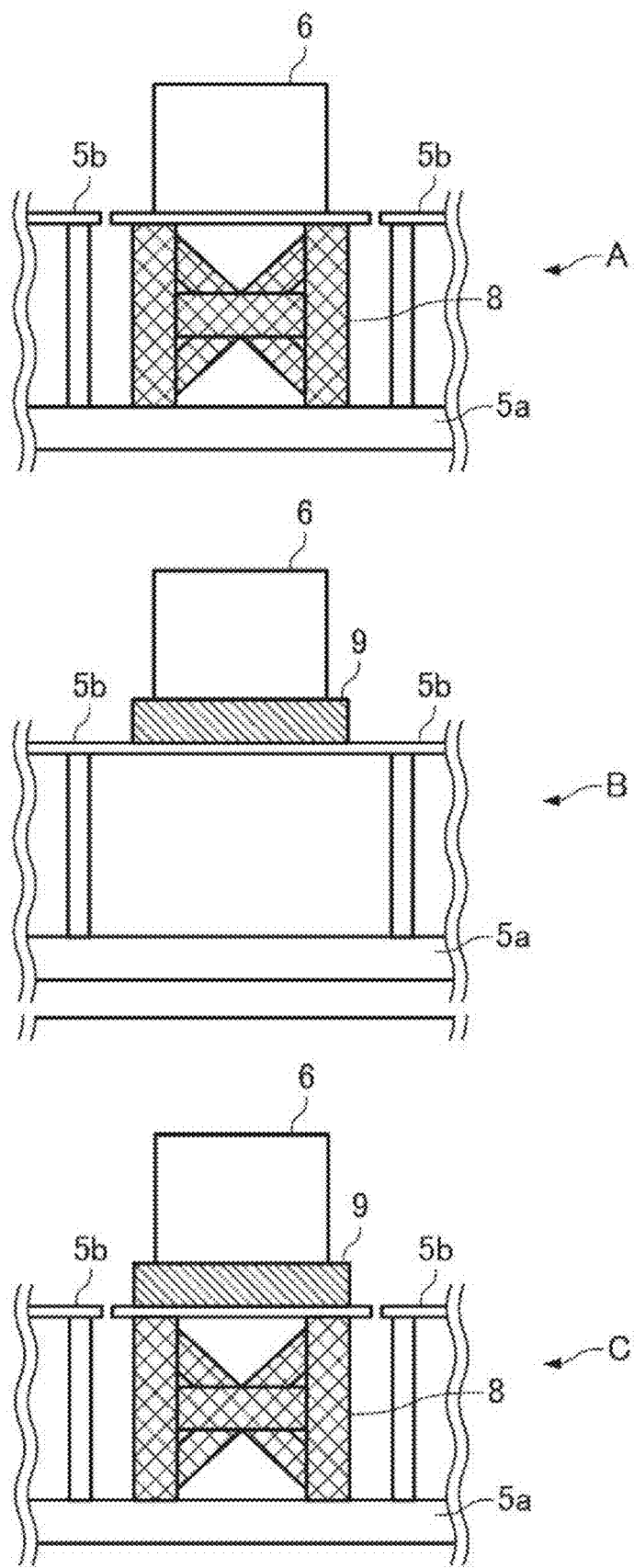
FIG. 3 is a diagram illustrating an installation example of a structural body.

For example, as illustrated in A of FIG. 3, when the structural body 6 is installed in the edge-cut portion of a FA floor 5b and a stiff support 8 is desired to be installed between a building floor 5a and the structural body 6, the user selects a stiff support having the same dimensions and weight resistance as the first support. FA is an abbreviation for Free Access. In this case, the building floor 5a corresponds to the floor 5 illustrated in FIGS. 1 and 2.

For example, as illustrated in B of FIG. 3, when the vibration isolation frame 9 is desired to be installed between the FA floor 5b and the structural body 6, the user selects a vibration isolation frame having the same dimensions and weight resistance as the first support. In this case, the FA floor 5b corresponds to the floor 5 illustrated in FIGS. 1 and 2.

The diagnostic device 2 generates a first diagnosis result related to vibration damping on the structural body 6 when the first support is installed between the floor 5 and the structural body 6, based on the first support selected based on the calculated first vibration information, an index related to the vibration of the structural body 6, and information displayed in the display device 3.

The index related to the vibration of the structural body 6 may be a standard of the vibration allowed for the structural body 6. For example, when the structural body 6 is a device such as a measurement device or a manufacturing device, the index may be an allowable vibration standard line. The allowable vibration standard line is a standard line of a vibration allowed in order to satisfy the accuracy and the resolution defined by the device.

The diagnostic device 2 may calculate second vibration information being information related to the vibration on the structural body 6 when the first support is installed between the floor 5 and the structural body 6, based on the first vibration information and the vibration transfer characteristics of the first support, which are prepared in advance. Then, the diagnostic device may generate the first diagnosis result based on the calculated second vibration information. The first diagnosis result may include a graph in which the index related to the vibration of the structural body 6 and the second vibration information are plotted. The graph may be, for example, a graph in which the index related to the vibration of the structural body 6 and the second vibration information are plotted in an overlapping manner. The graph may be, for example, a tripartite graph. The tripartite graph is a graph including numerical values of three items related to vibration. The three items may be the velocity, the acceleration and the displacement of vibration.

The diagnostic device 2 outputs the generated first diagnosis result to the display device 3, and the first diagnosis result is displayed on the display device 3. For example, in the example of FIG. 1, the diagnostic device 2 directly outputs the first diagnosis result to the display device 3. In the example of FIG. 2, the diagnostic device 2 outputs the first diagnosis result to the display device 3 via the network 7.

The user of the diagnostic system 1 can see the first diagnosis result displayed on the display device 3 and determine whether or not the vibration damping for the structural body 6 is sufficient. When the vibration damping is sufficient, the user can obtain the conclusion that the first support is installed between the floor 5 and the structural body 6. When the vibration damping is insufficient, the user may reselect the first support and see the first diagnosis result displayed on the display device 3. Then, the first support causing vibration damping to be sufficiently or most improved may be specified by repeating determination of whether or not the vibration damping is sufficient or improved.

Alternatively, when the vibration damping is insufficient, the user may select a second support to be installed between the floor 5 and the structural body 6 together with the first support, based on the information displayed on the display device 3. For example, as illustrated in C of FIG. 3, when it is desired to install the structural body 6 in the edge-cut portion of the FA floor 5*b*, and to install the stiff support 8 and the vibration isolation frame 9 between the building floor 5*a* and the structural body 6, the user selects the stiff support having the same dimensions and weight resistance as the first support and selects the vibration isolation frame having the same dimensions and weight resistance as the second support. In this case, the building floor 5*a* corresponds to the floor 5 illustrated in FIGS. 1 and 2.

The diagnostic device 2 generates a second diagnosis result related to vibration damping on the structural body 6 when the first support and the second support are installed between the floor 5 and the structural body 6, based on the second support selected based on the calculated second vibration information, the index related to the vibration of the structural body 6, and the information displayed on the display device 3.

The diagnostic device 2 may calculate third vibration information being information related to the vibration on the structural body 6 when the first support and the second support are installed between the floor 5 and the structural body 6, based on the second vibration information and the vibration transfer characteristics of the second support, which are prepared in advance. Then, the diagnostic device may generate the second diagnosis result based on the calculated third vibration information. The second diagnosis result may include a graph in which the index related to the vibration of the structural body 6 and the third vibration information are plotted. The graph may be, for example, a tripartite graph.

The diagnostic device 2 outputs the generated second diagnosis result to the display device 3, and the second diagnosis result is displayed on the display device 3. The user of the diagnostic system 1 can see the second diagnosis result displayed on the display device 3 and determine whether or not the vibration damping for the structural body 6 is sufficient. When the vibration damping is sufficient, the user can obtain the conclusion that the first support and the second support are installed between the floor 5 and the structural body 6. When the vibration damping is insufficient, the user may reselect the second support and see the second diagnosis result displayed on the display device 3. Then, the second support causing vibration damping to be sufficiently or most improved may be specified by repeating determination of whether or not the vibration damping is sufficient or improved.

1-2. Specific Example of Screen Displayed on Display Device

FIGS. 4 to 21 are views illustrating an example of screens displayed on the display device 3. The screen displayed on the display device 3 transitions in the order of the screens illustrated in, for example, FIGS. 4 to 21.

Figure 4:
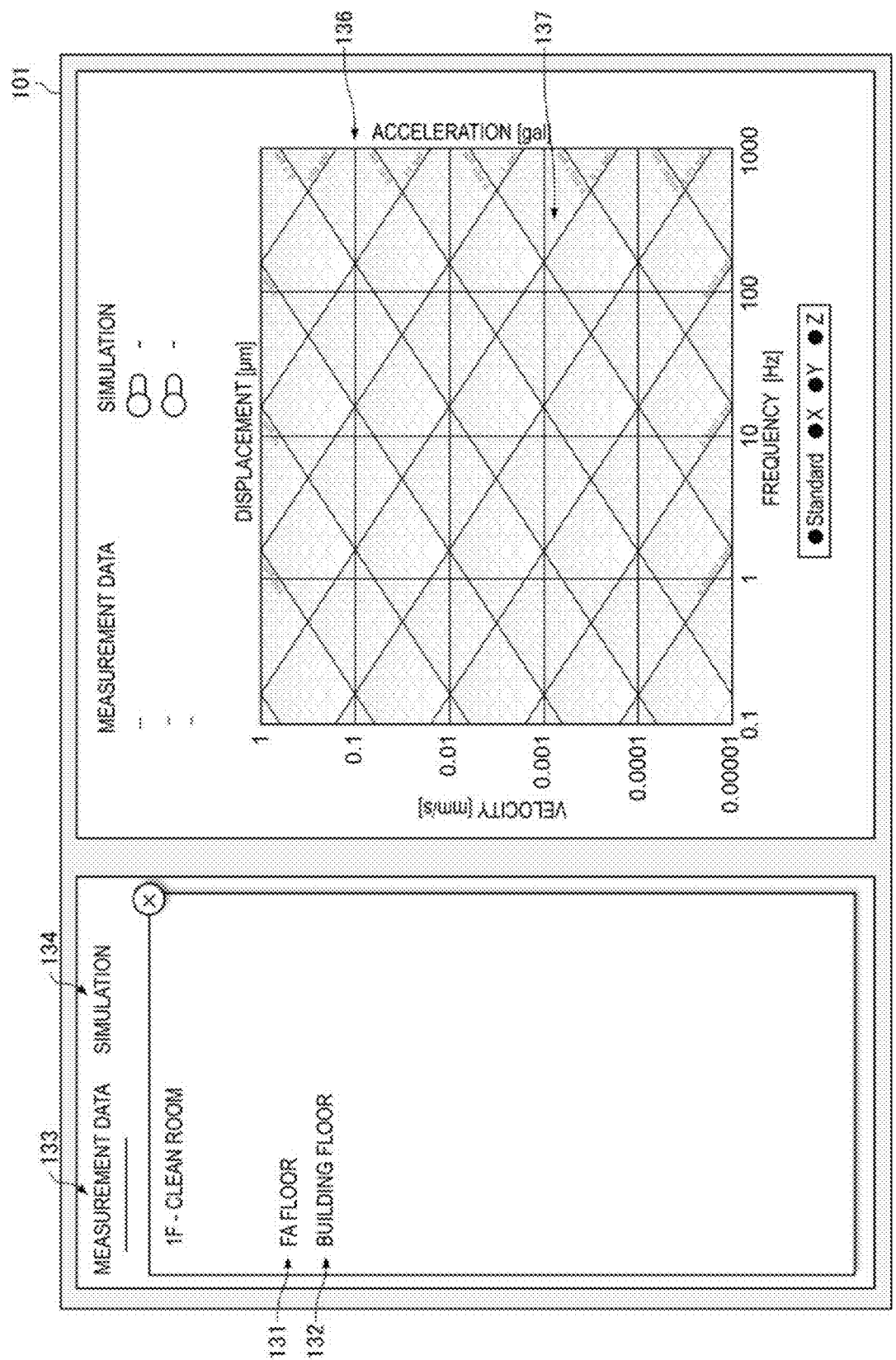
FIG. 4 is a view illustrating an example of a screen displayed on a display device.

When the user starts application software installed on the diagnostic device 2 or the display device 3 and then selects a file in which the data of the detection signal of the inertial sensor 4 is written, the selected file is read, and a screen 101 illustrated in FIG. 4 is displayed on the display device 3. Here, it is assumed that the user selects a file in which the data of the detection signal output from the inertial sensor 4 disposed on the building floor 5*a* is written and a file in which the data of the detection signal output from the inertial sensor 4 disposed on the FA floor 5*b* is written, and thus such two files are read. The user may select only one of the files when only one of the two files is required.

The screen 101 illustrated in FIG. 4 includes an FA floor button 131, a building floor button 132, a measurement data button 133, and a simulation button 134. The screen 101 includes a tripartite graph 136 in which vibration information is not plotted. A tripartite graph 136 is a graph in which, with respect to a frequency on a horizontal axis, a vertical axis is set for a velocity, a direction from the lower left to the upper right is set to indicate an acceleration, and a direction from the upper left to the lower right is set to indicate displacement.

Figure 5:
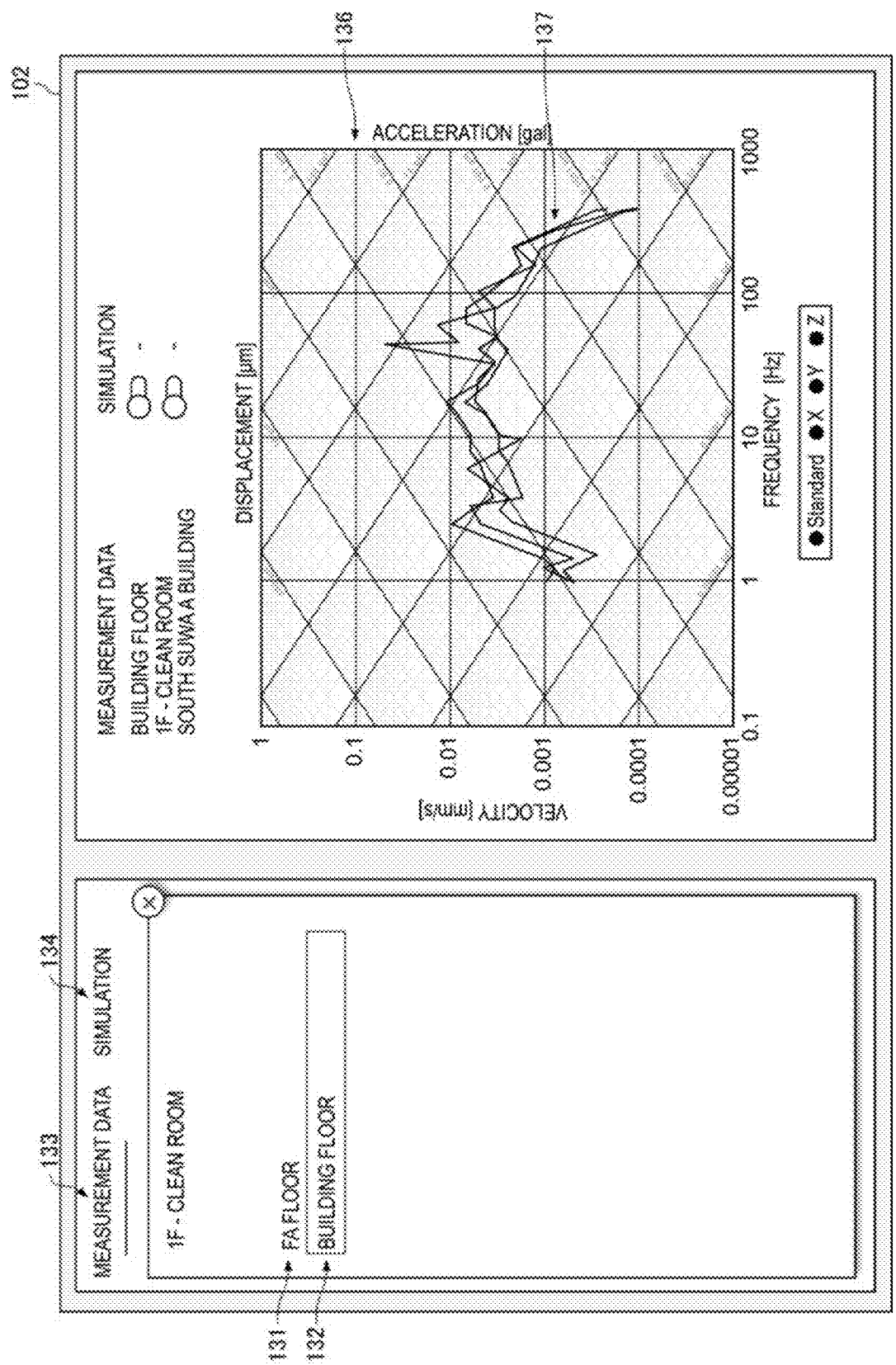
FIG. 5 is a view illustrating an example of a screen displayed on the display device.

When the user clicks the building floor button 132 on the screen 101, the screen 101 transitions to a screen 102 illustrated in FIG. 5. The screen 102 includes vibration data 137 in each direction of an X-axis, a Y-axis, and a Z-axis plotted on the tripartite graph 136. The vibration data 137 is the first vibration information calculated by the diagnostic device 2 based on the data of the detection signal output from the inertial sensor 4 disposed on the building floor 5*a*. Specifically, the data of the detection signal is time-series data of the acceleration. First, the diagnostic device 2 performs Fourier transform of the time-series data of the acceleration to create a graph in which a horizontal axis indicates the frequency and a vertical axis indicates the acceleration. Then, the diagnostic device 2 calculates the vibration data 137 by dividing the acceleration on the vertical axis by $2\pi f$ and converting the resultant of the division into a velocity for each frequency f. The velocity scale and the acceleration scale on the tripartite graph 136 are set to obtain a relation of velocity=acceleration/$2\pi f$. The displacement scale and the acceleration scale on the tripartite graph 136 are set to obtain a relation of displacement=acceleration/$(2\pi f)^2$.

Although not illustrated, when the user clicks the FA floor button 131 on the screen 101, the diagnostic device 2 calculates vibration data being the first vibration information, based on the data of the detection signal output from the inertial sensor 4 disposed on the FA floor 5b. Then, the screen transitions to a screen on which the calculated vibration data is plotted on the tripartite graph 136.

Figure 6:
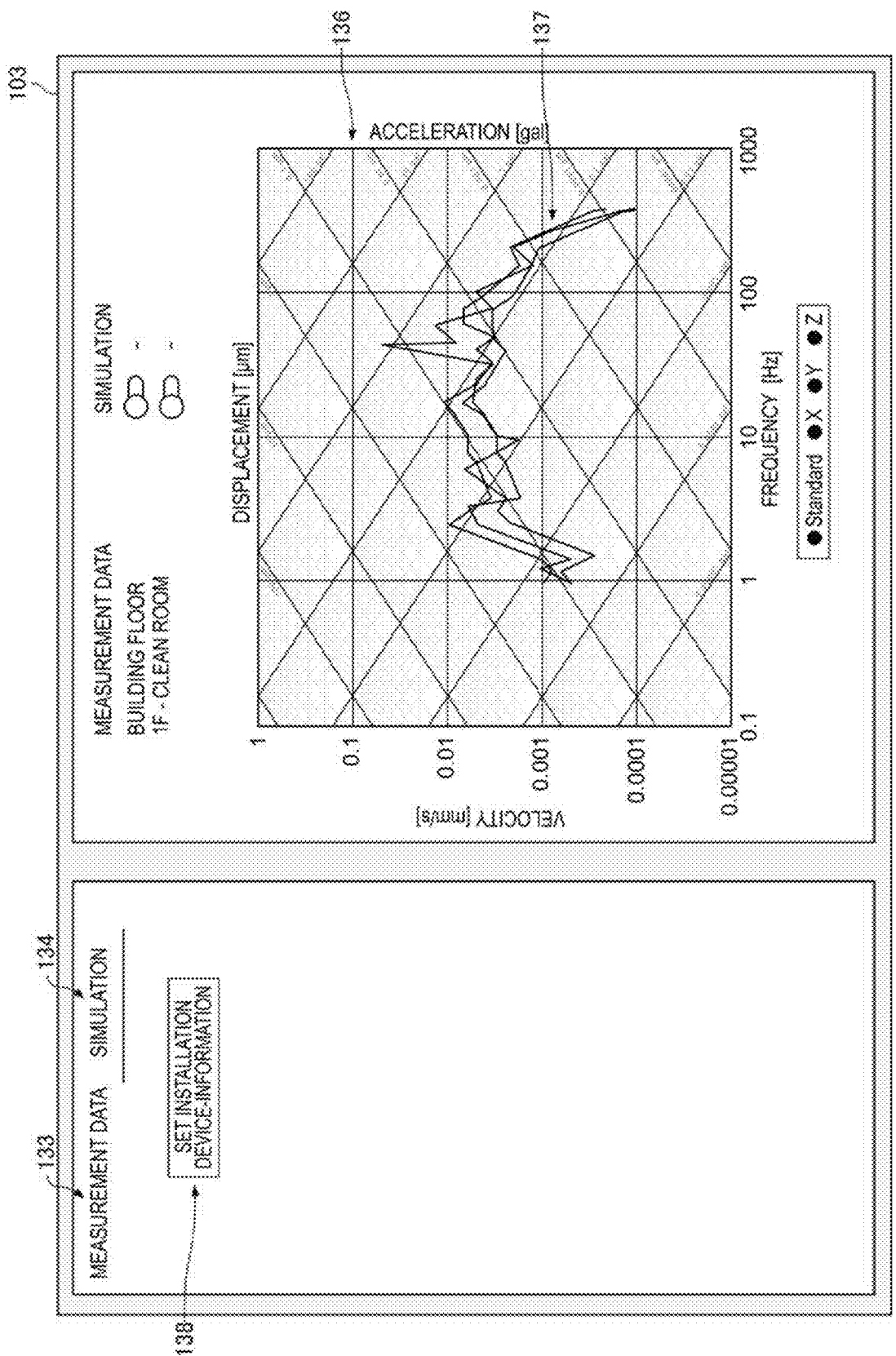
FIG. 6 is a view illustrating an example of a screen displayed on the display device.

When the user clicks the simulation button 134 on the screen 102, the screen 102 transitions to a screen 103 illustrated in FIG. 6. The screen 103 includes an installation device-information setting button 138.

Figure 7:
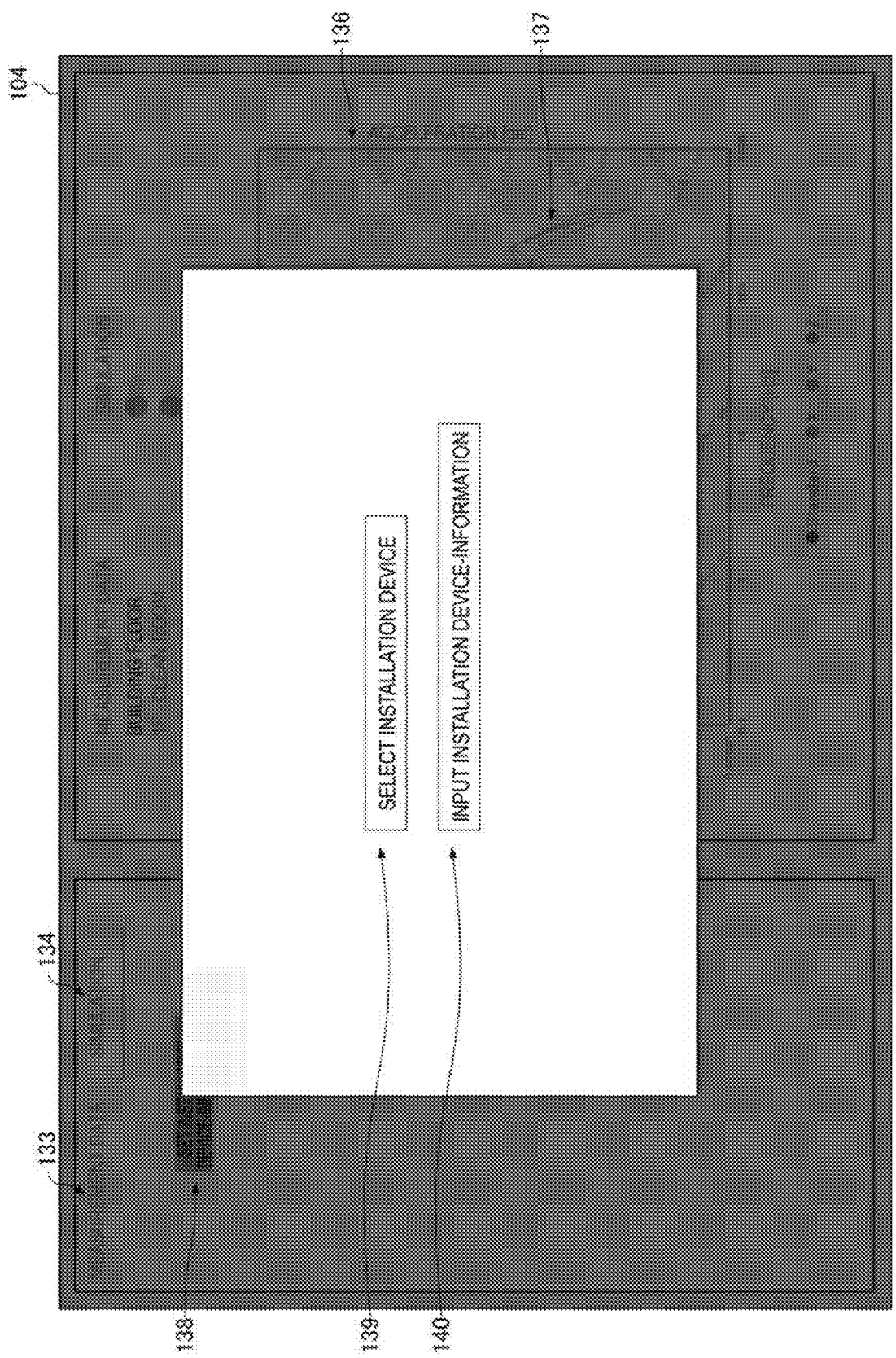
FIG. 7 is a view illustrating an example of a screen displayed on the display device.

When the user clicks the installation device-information setting button 138 on the screen 103, the screen 103 transitions to a screen 104 illustrated in FIG. 7. The screen 104 includes an installation device selection button 139 and an installation device-information input button 140.

Figure 8:
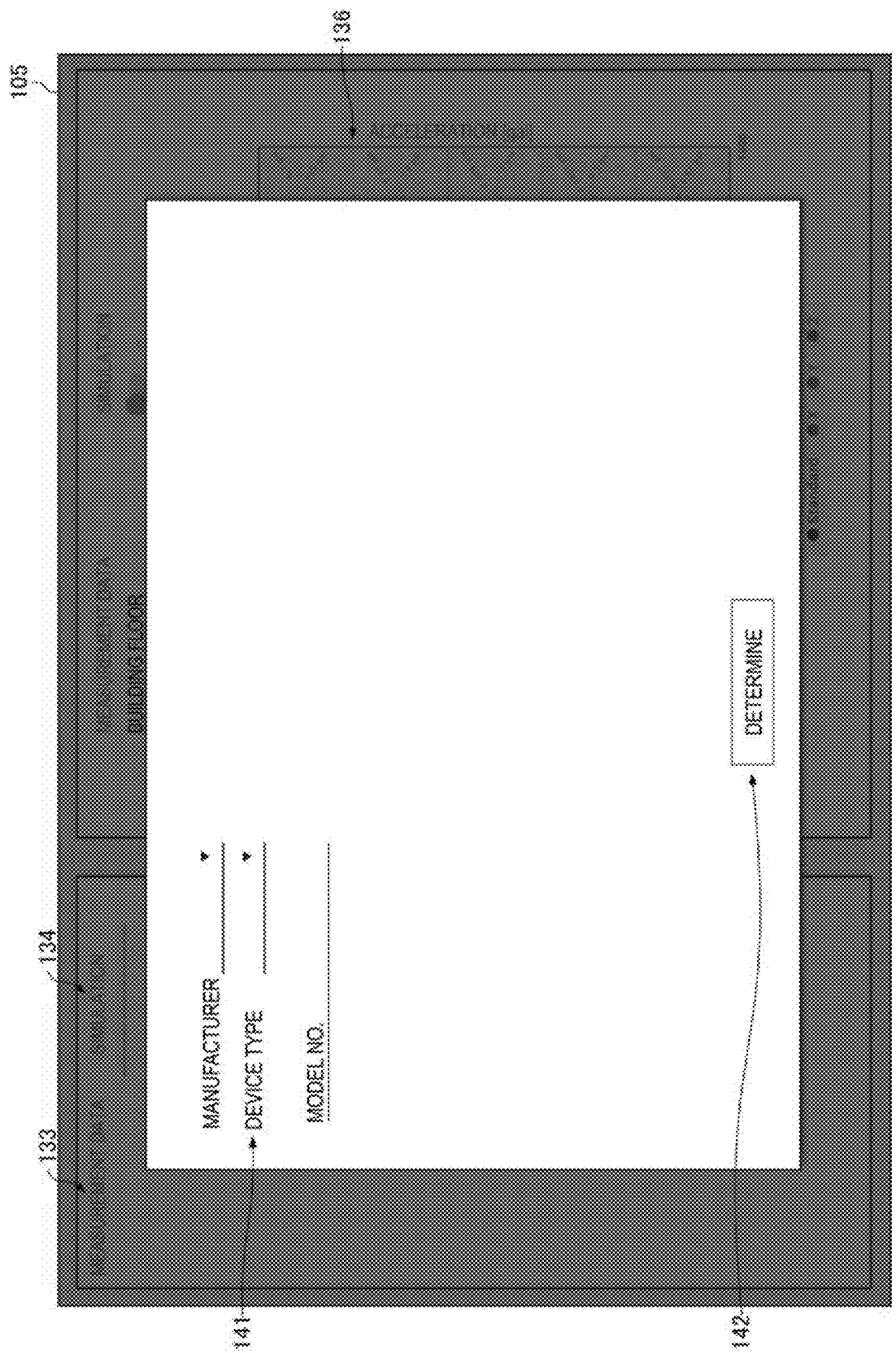
FIG. 8 is a view illustrating an example of a screen displayed on the display device.

When the user clicks the installation device selection button 139 on the screen 104, the screen 104 transitions to a screen 105 illustrated in FIG. 8. The screen 105 includes an installation device selection field 141 and a determination button 142.

Figure 9:
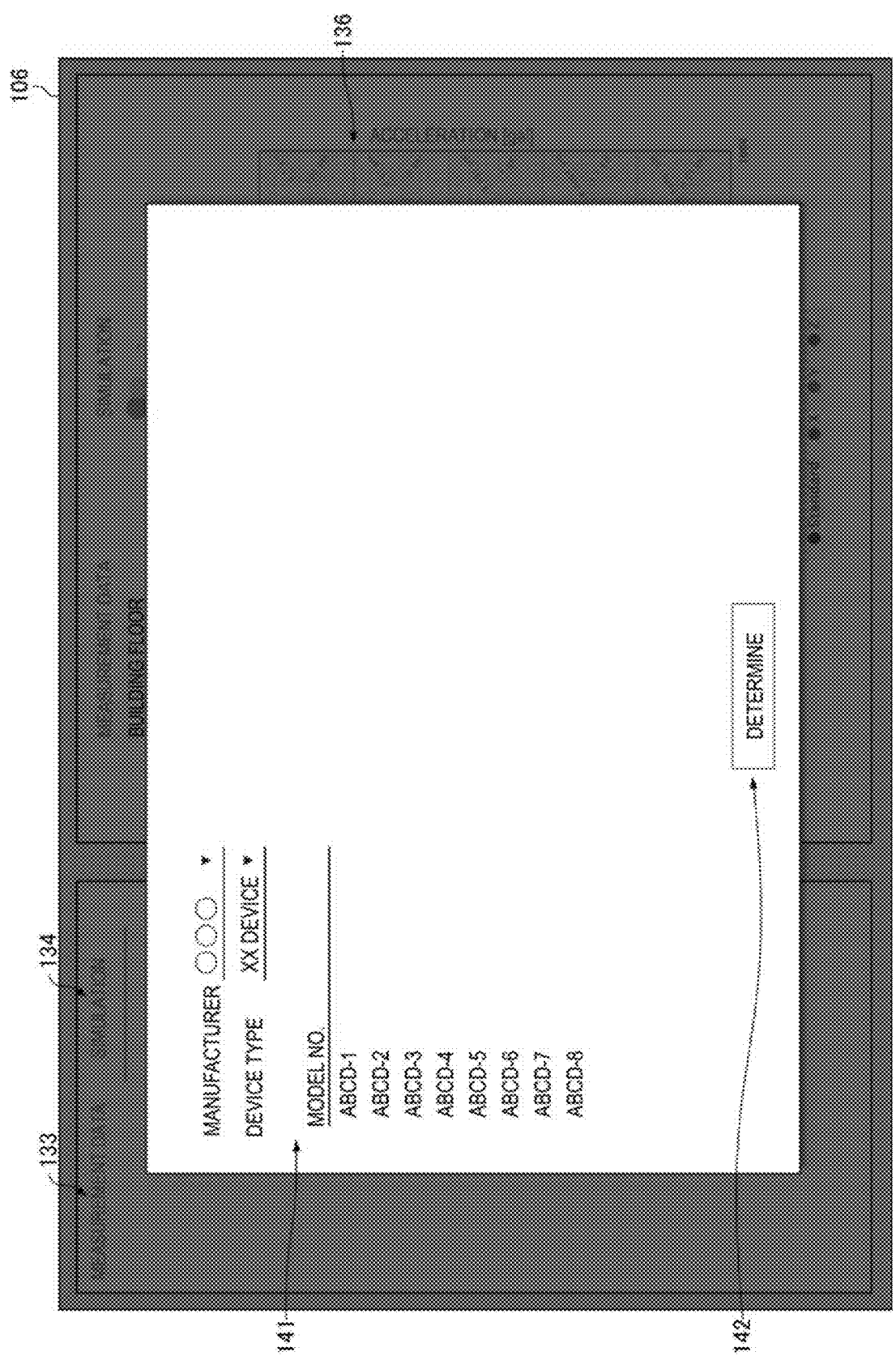
FIG. 9 is a view illustrating an example of a screen displayed on the display device.

When the user selects the manufacturer and the type of device in the installation device selection field 141 on the screen 105, the screen 105 transitions to a screen 106 illustrated in FIG. 9. The screen 106 includes an installation device selection field 141 containing information on the selected manufacturer and device and information on a plurality of selectable model numbers.

Figure 10:
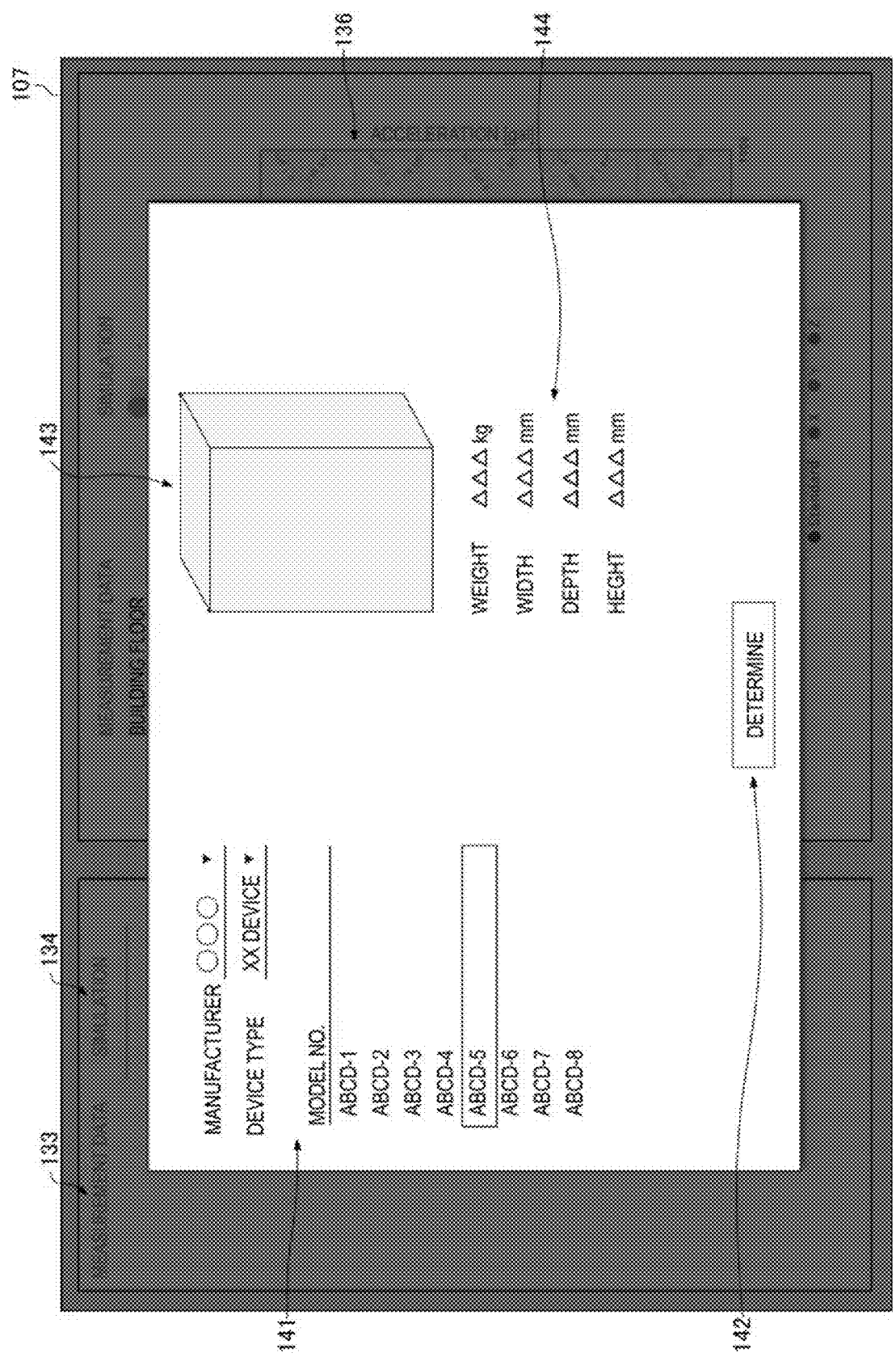
FIG. 10 is a view illustrating an example of a screen displayed on the display device.

When the user selects the model number of the device in the installation device selection field 141 on the screen 106, the screen 106 transitions to a screen 107 illustrated in FIG. 10. The screen 107 includes an appearance 143 of the selected device and device information 144 such as a weight, a width, a depth, and a height.

Figure 11:
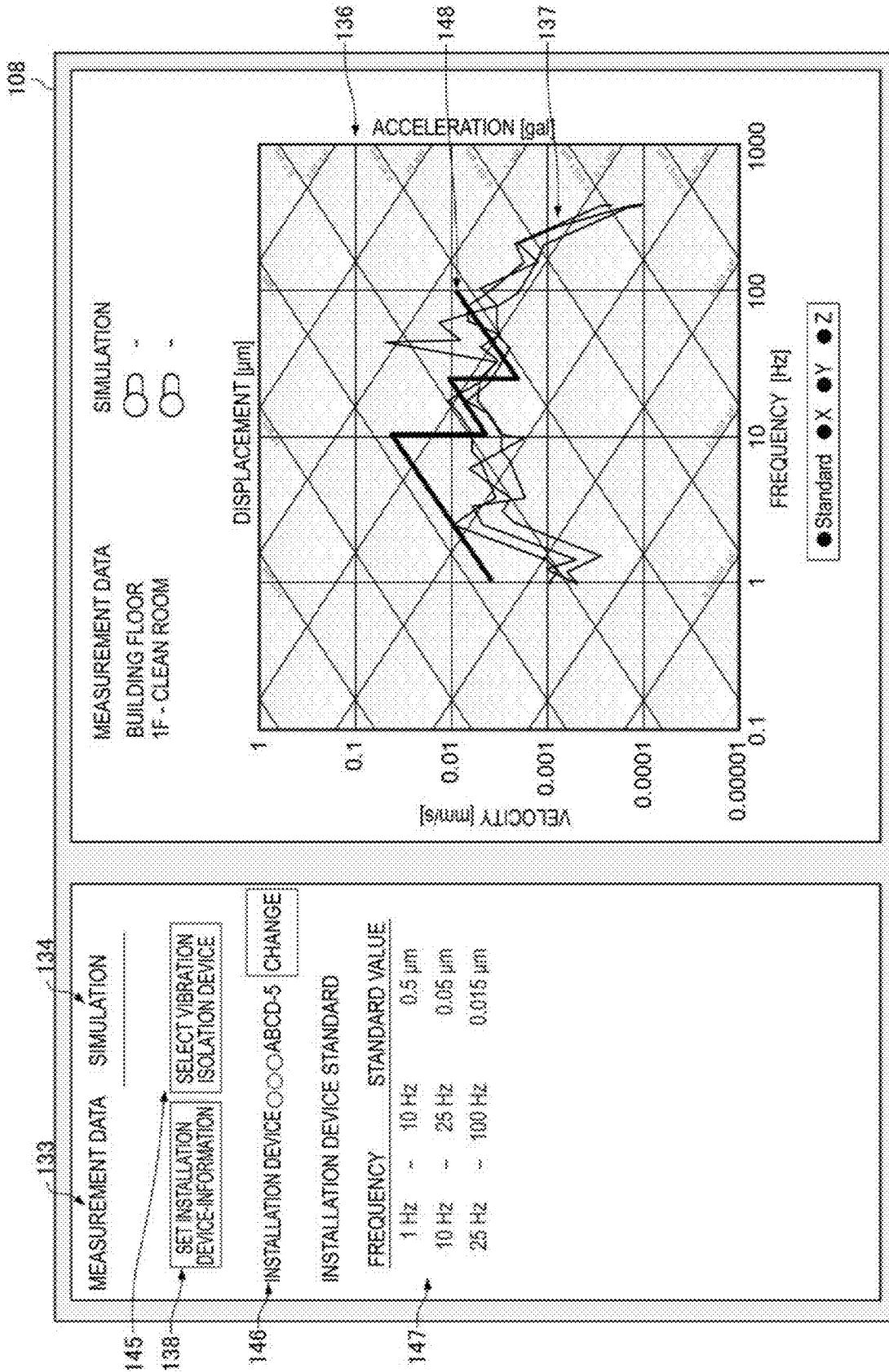
FIG. 11 is a view illustrating an example of a screen displayed on the display device.

When the user clicks the determination button 142 on the screen 107, the screen 107 transitions to a screen 108 illustrated in FIG. 11. The screen 108 includes a vibration isolation device selection button 145, a selected-device information field 146 containing information on the name and model number of the selected device, an allowable vibration standard information field 147, and an allowable vibration standard line 148. The allowable vibration standard information field 147 contains information on the standard value in each vibration frequency range. The allowable vibration standard line 148 is obtained by plotting the information in the allowable vibration standard information field 147 on the tripartite graph 136.

Figure 12:
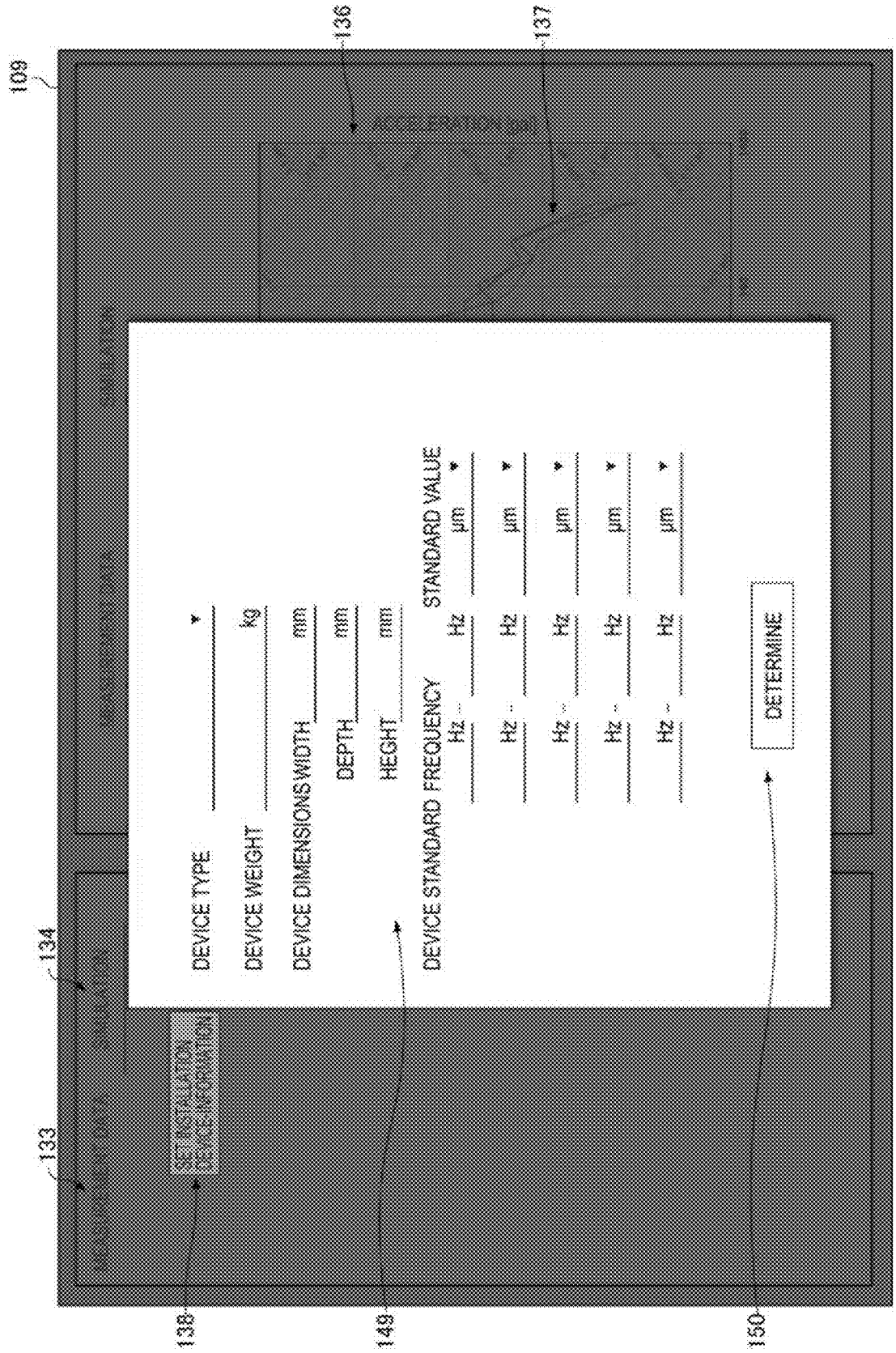
FIG. 12 is a view illustrating an example of a screen displayed on the display device.

When the user clicks the installation device-information input button 140 on the screen 104 illustrated in FIG. 7, the screen 104 transitions to a screen 109 illustrated in FIG. 12. The screen 109 includes an installation device-information input field 149 and a determination button 150.

Figure 13:
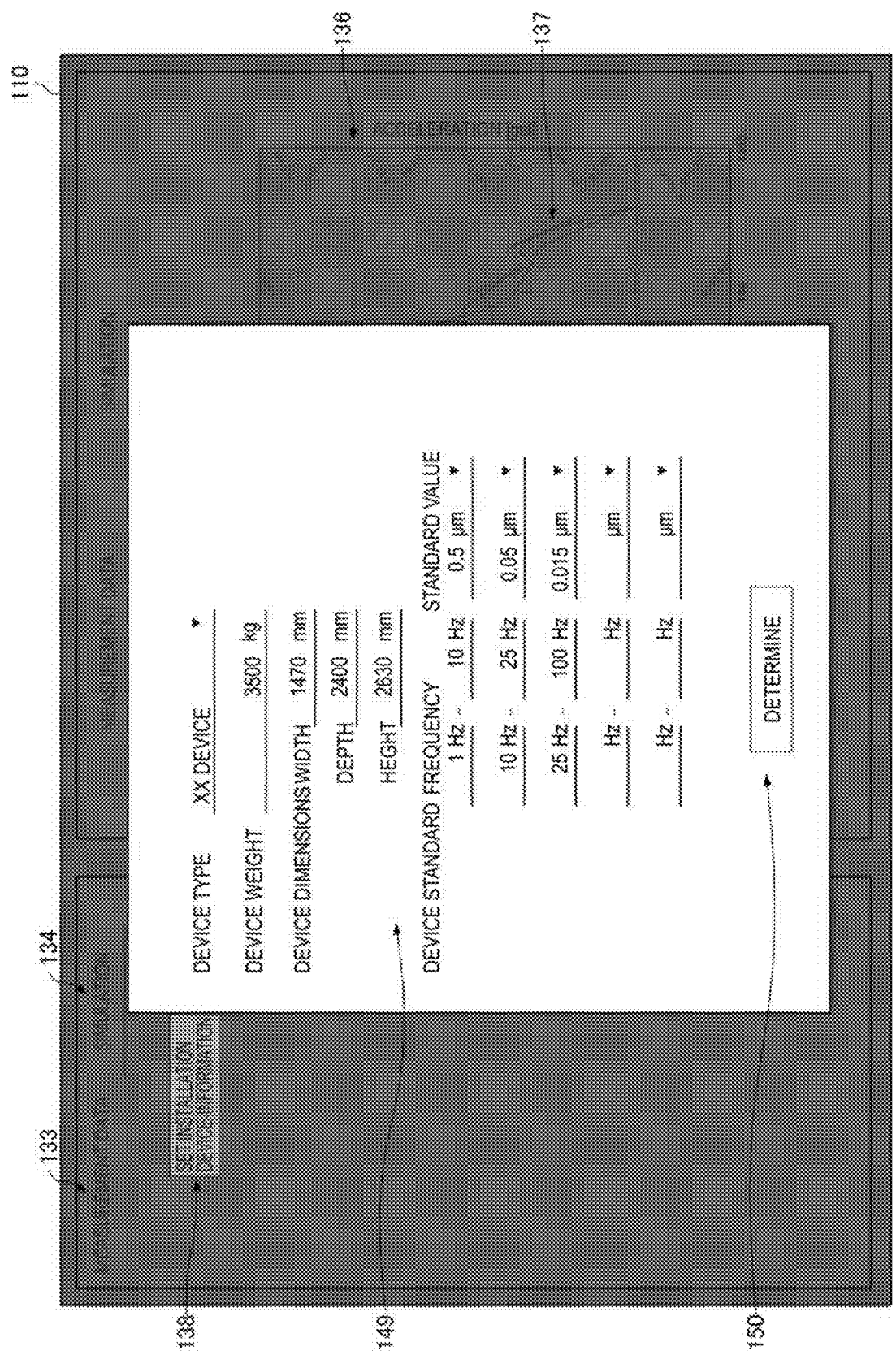
FIG. 13 is a view illustrating an example of a screen displayed on the display device.

The user inputs the type, weight, dimensions, and allowable vibration standard of the device in the installation device-information input field 149 on the screen 109. The screen 110 illustrated in FIG. 13 is a screen in a state in which the input to the installation device-information input field 149 is completed.

Figure 14:
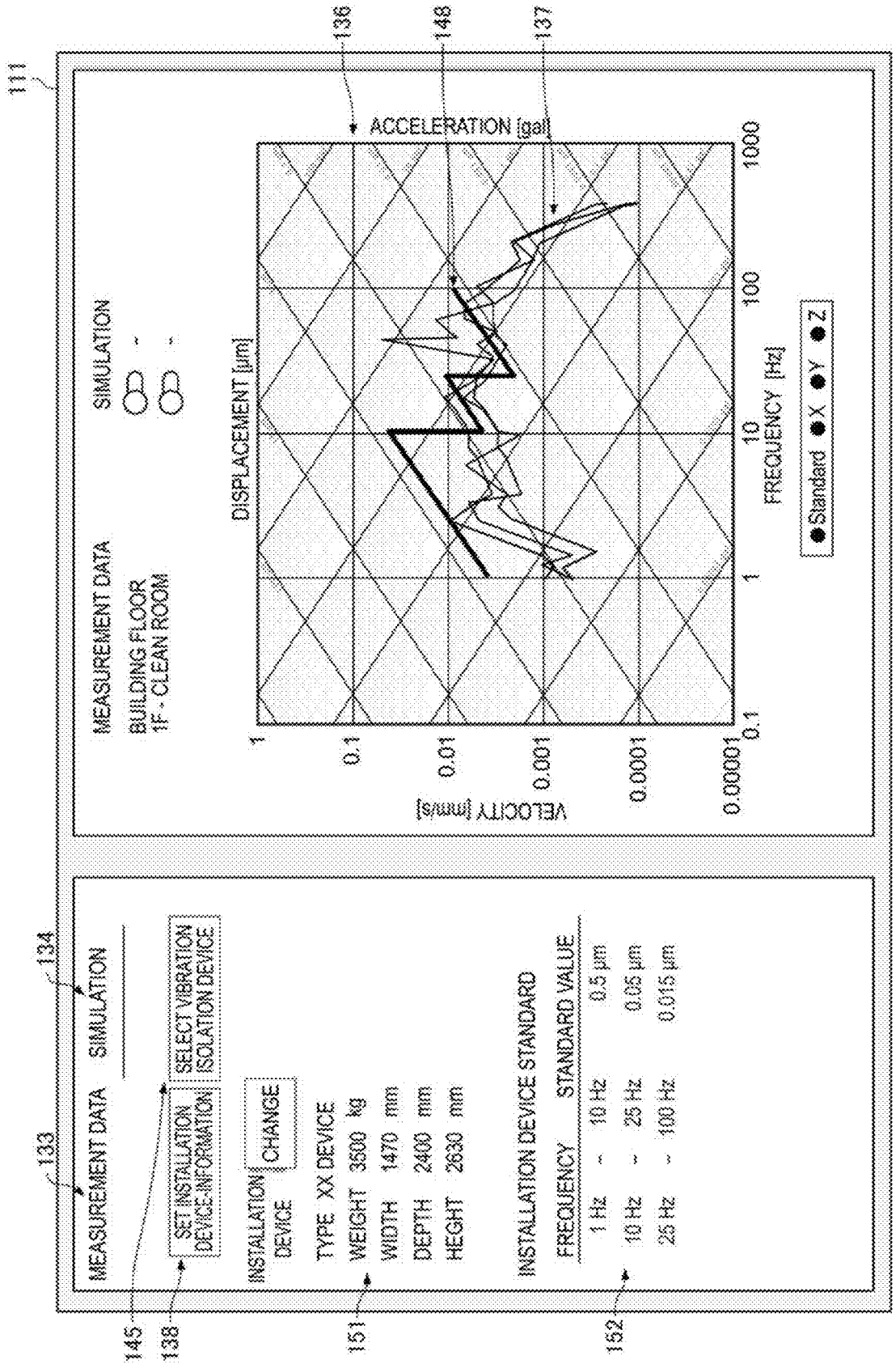
FIG. 14 is a view illustrating an example of a screen displayed on the display device.

When the user clicks the determination button 150 on the screen 110, the screen 110 transitions to a screen 111 illustrated in FIG. 14. The screen 111 includes a vibration isolation device selection button 145, a selected-device information field 151, an allowable vibration standard information field 152 containing the input allowable vibration information, and an allowable vibration standard line 148. The selected-device information field 151 contains information such as the type, the weight, the width, the depth, and the height of the input device. The allowable vibration standard line 148 is obtained by plotting the information in the allowable vibration standard information field 152 on the tripartite graph 136.

Figure 15:
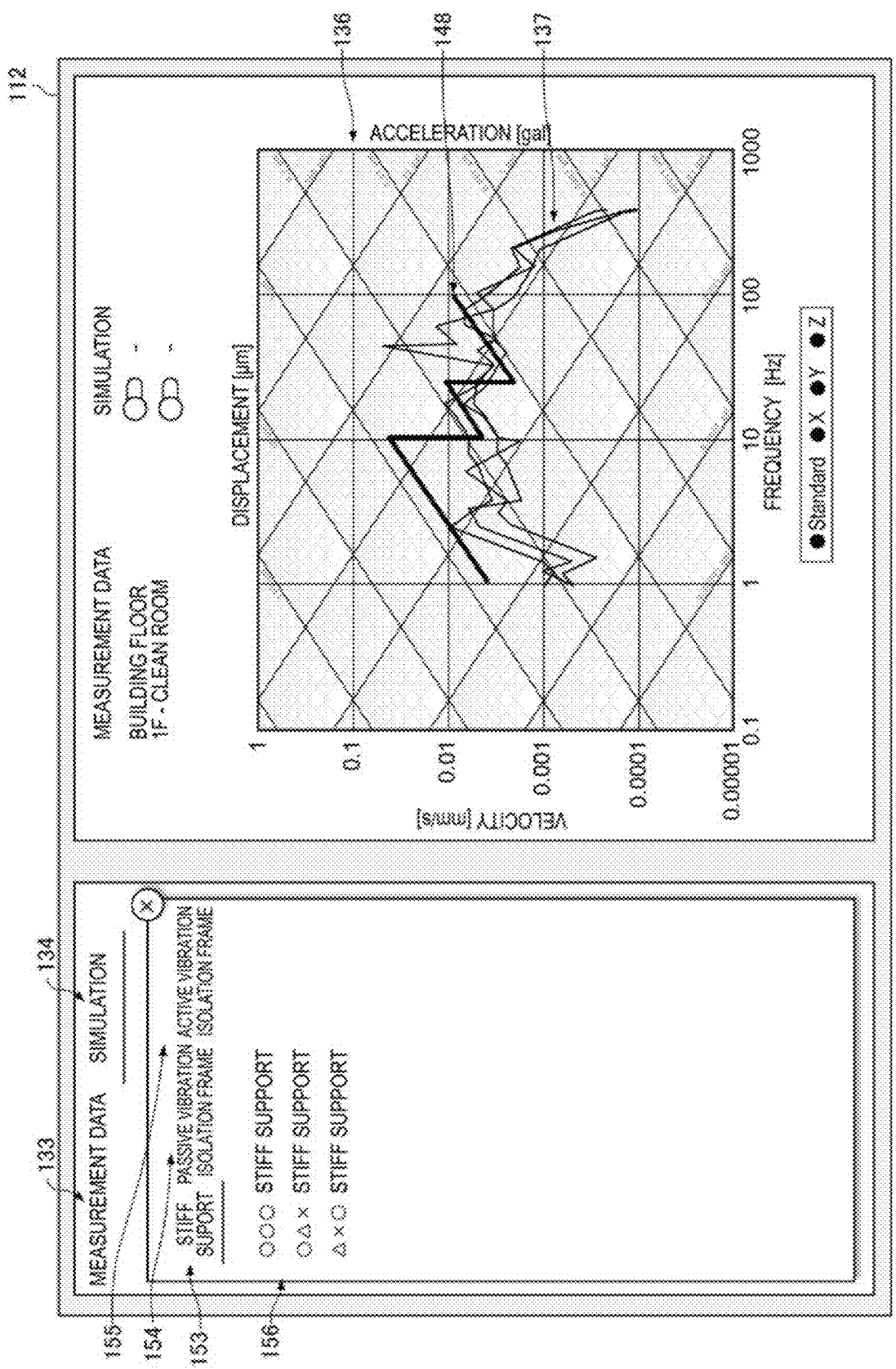
FIG. 15 is a view illustrating an example of a screen displayed on the display device.

When the user clicks the vibration isolation device selection button 145 on the screen 108 illustrated in FIG. 11 or on the screen 111 illustrated in FIG. 14, the screen 108 or the screen 111 transitions to a screen 112 illustrated in FIG. 15. The screen 112 includes a stiff support button 153, a passive vibration isolation frame button 154, an active vibration isolation frame button 155, and a stiff support information field 156 containing information on all registered stiff supports.

Figure 16:
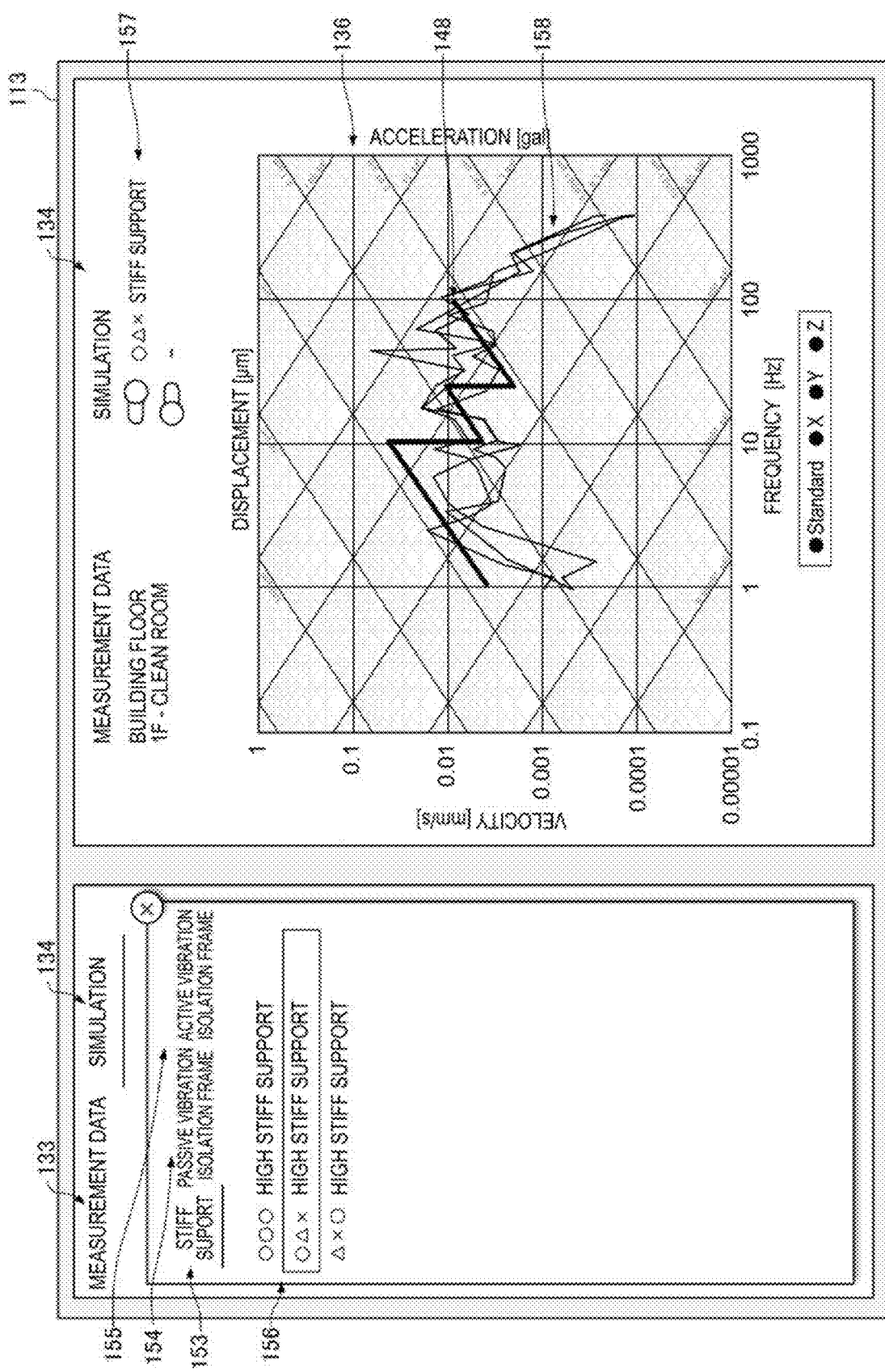
FIG. 16 is a view illustrating an example of a screen displayed on the display device.

When the user clicks on any of the stiff supports displayed in the stiff support information field 156 on the screen 112 illustrated in FIG. 15, the clicked stiff support is selected as the first support, and the screen 112 transitions to a screen 113 illustrated in FIG. 16. The screen 113 includes a selected-stiff support information field 157 containing information on the selected stiff support, and vibration data 158 in each direction of the X-axis, the Y-axis, and the Z-axis plotted on the tripartite graph 136. The vibration data 158 refers to the second vibration information calculated by the diagnostic device 2 based on the first vibration information being the vibration data 137 included in the screen 102 illustrated in FIG. 5 and the vibration transfer characteristics of the selected stiff support. The vibration transfer characteristics of each stiff support as a candidate for the first support can be obtained, for example, by actually measuring the vibration transferred through each stiff support in advance.

The first diagnosis result including the tripartite graph 136 being a graph in which the allowable vibration standard line 148 as the index related to the vibration of the structural body 6 being the selected device and the vibration data 158 as the second vibration information are plotted is shown on the screen 113. The first diagnosis result is a diagnosis result when a stiff support selected as the first support is installed between the building floor 5a and the structural body 6 being the selected device. The stiff support does not have vibration transfer characteristics of attenuating the vibration. Thus, the level of the vibration data 158 is slightly higher than that of the vibration data 137, and the vibration level at a frequency of 10 Hz to 100 Hz greatly exceeds the allowable vibration standard line 148. Therefore, the user clicks, for example, the passive vibration isolation frame button 154 in order to obtain a diagnosis result having a more reduced vibration level.

Figure 17:
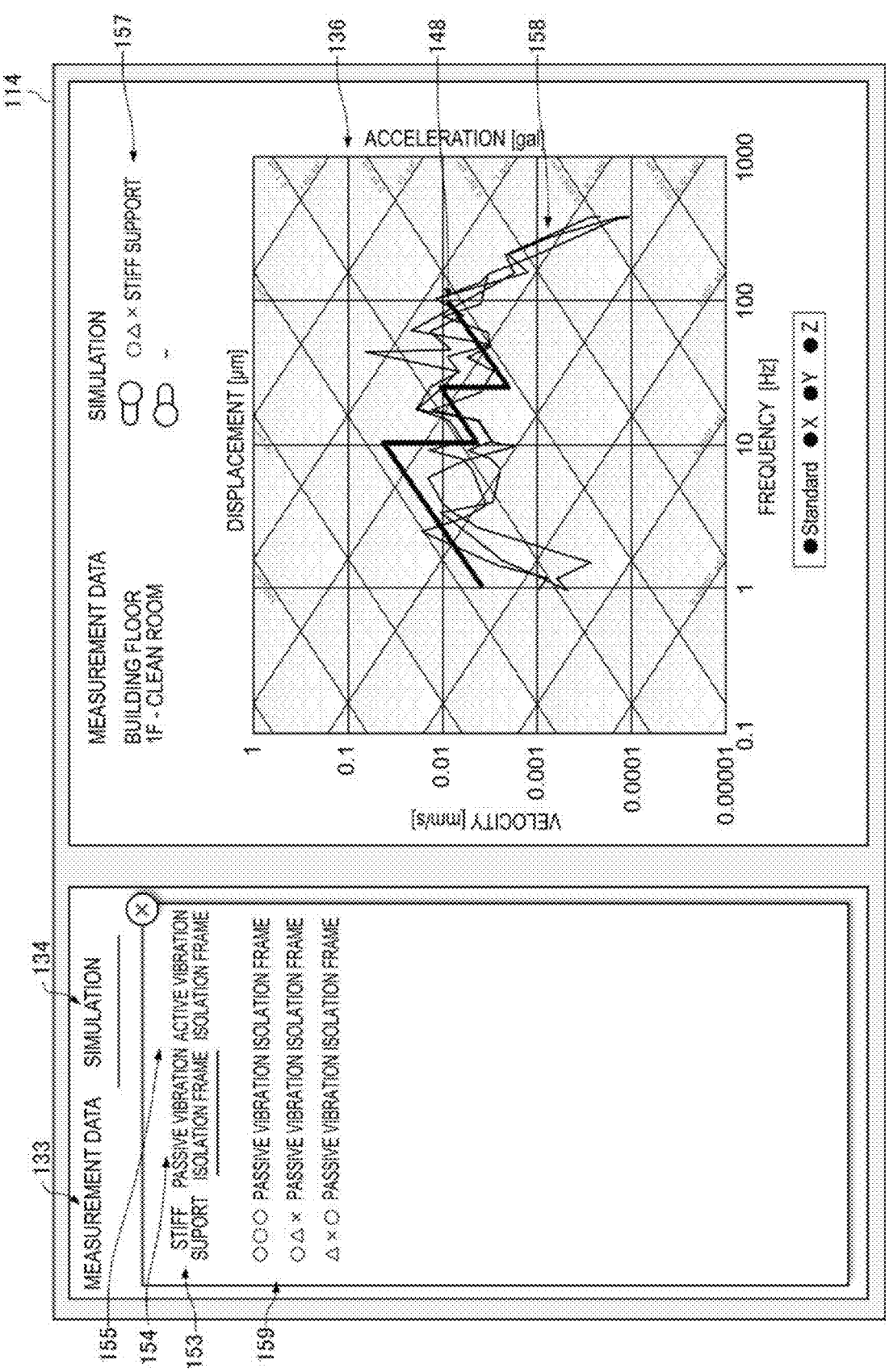
FIG. 17 is a view illustrating an example of a screen displayed on the display device.

When the user clicks the passive vibration isolation frame button 154 on the screen 113 illustrated in FIG. 16, the screen 113 transitions to a screen 114 illustrated in FIG. 17. The screen 114 includes a passive vibration isolation frame information field 159 containing information on all registered passive vibration isolation frames.

Figure 18:
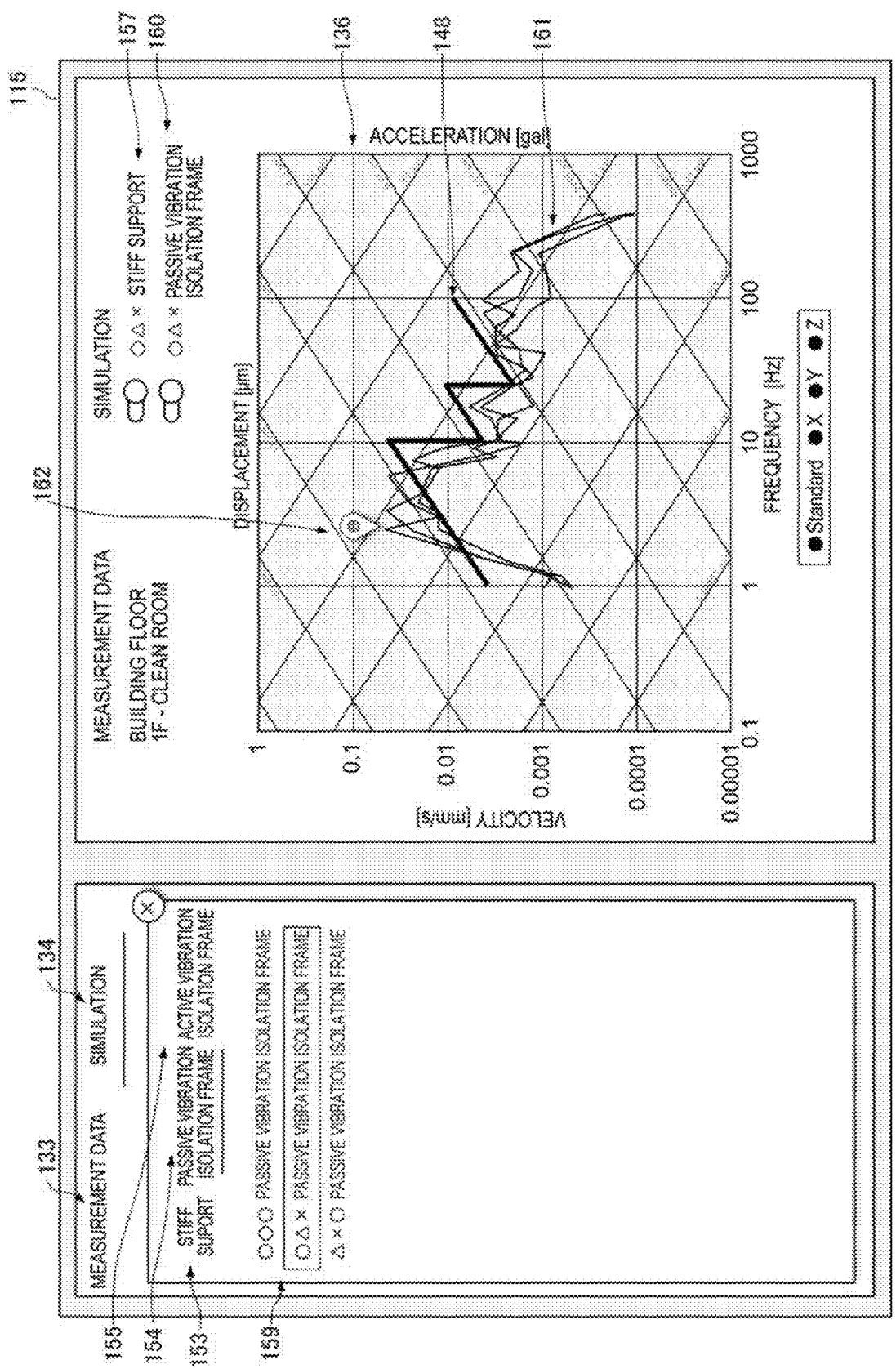
FIG. 18 is a view illustrating an example of a screen displayed on the display device.

When the user clicks on any of the passive vibration isolation frames displayed in the passive vibration isolation frame information field 159 on the screen 114 illustrated in FIG. 17, the clicked passive vibration isolation frame is selected as the second support, and the screen 114 transitions to a screen 115 illustrated in FIG. 18. The screen 115 includes a selected-passive vibration isolation frame information field 160 containing information on the selected passive vibration isolation frame and vibration data 161 in each direction of the X-axis, the Y-axis, and the Z-axis plotted on the tripartite graph 136. The vibration data 161 refers to the third vibration information calculated by the diagnostic device 2 based on the second vibration information being the vibration data 158 included in the screen 113 illustrated in FIG. 16 and the vibration transfer characteristics of the selected passive vibration isolation frame. The vibration transfer characteristics of each vibration isolation frame as a candidate for the second support may be, for example, vibration damping characteristics provided by each manufacturer.

The second diagnosis result including the tripartite graph 136 being a graph in which the allowable vibration standard line 148 as the index related to the vibration of the structural body 6 being the selected device and the vibration data 161 as the third vibration information are plotted is shown on the screen 115. The second diagnosis result is a diagnosis result when a stiff support selected as the first support and a passive vibration isolation frame selected as the second support are installed between the building floor 5a and the structural body 6 being the selected device. The selected passive vibration isolation frame has vibration transfer characteristics of attenuating the vibration at a frequency of 10 Hz to 100 Hz. Thus, the level of the vibration data 161 at the frequency of 10 Hz to 100 Hz is lower than that of the vibration data 158 and lower than the allowable vibration standard line 148. However, the vibration level at a frequency of 1 Hz to 10 Hz exceeds the allowable vibration standard line 148.

The screen 115 includes a recommendation mark 162. When the user moves the cursor onto the recommendation mark 162, the screen 115 transitions to a screen 116 illustrated in FIG. 19. The screen 116 includes recommendation information 163.

Figure 19:
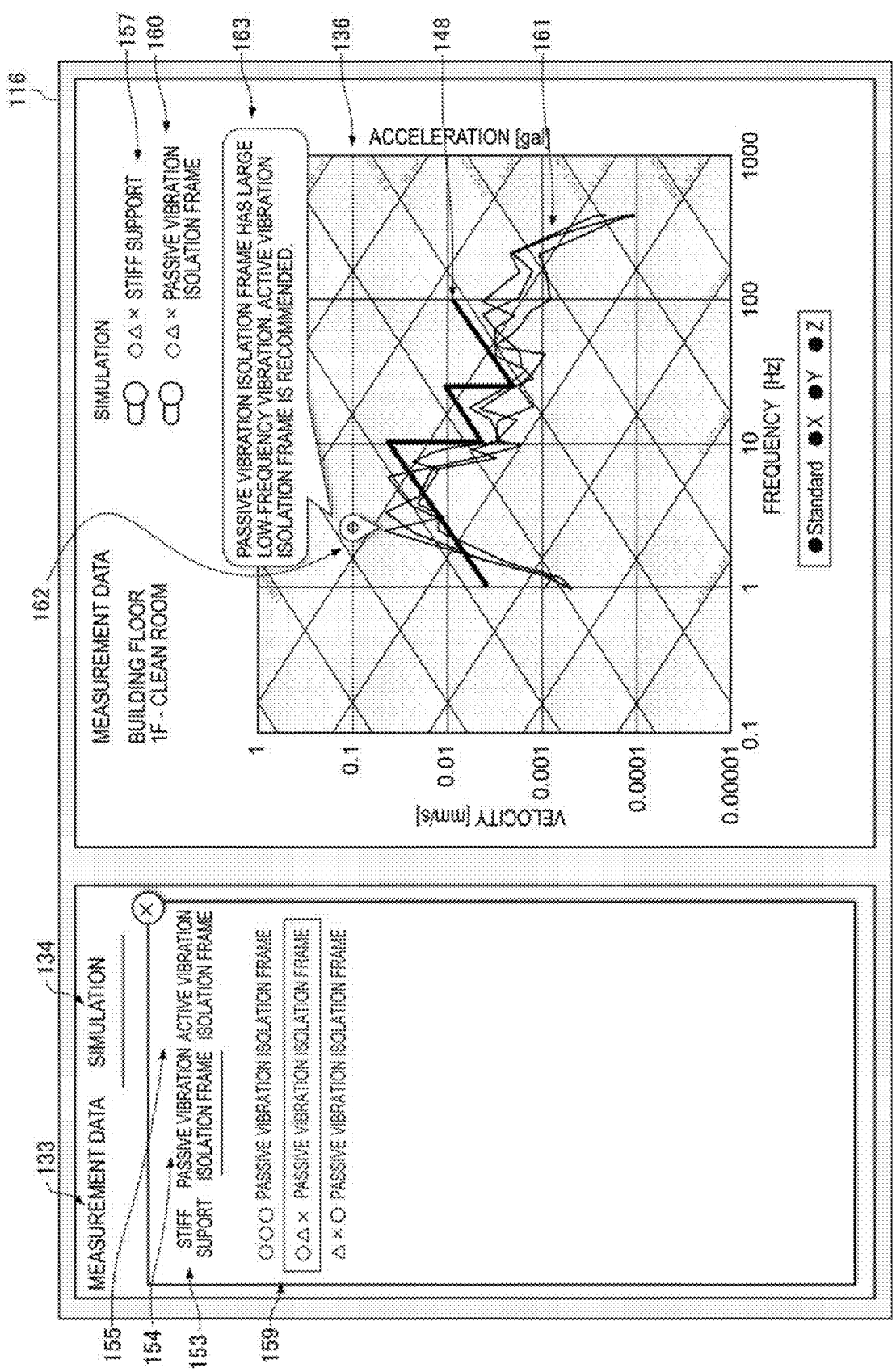
FIG. 19 is a view illustrating an example of a screen displayed on the display device.
Figure 20:
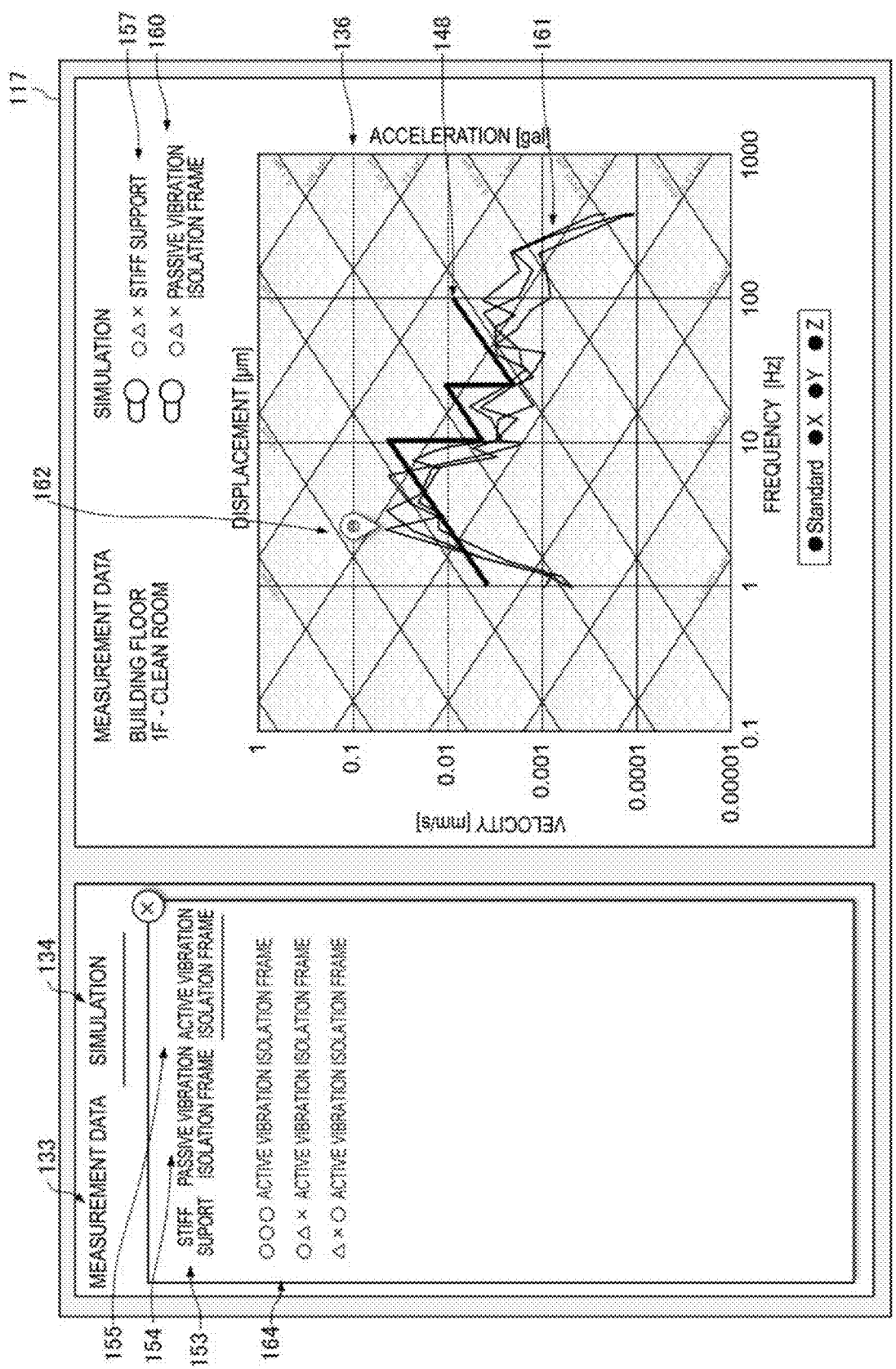
FIG. 20 is a view illustrating an example of a screen displayed on the display device.

When the user clicks the active vibration isolation frame button 155 in accordance with the recommendation information 163 in order to obtain a diagnosis result having a more reduced vibration level, on the screen 116 illustrated in FIG. 19, the screen 116 transitions to a screen 117 illustrated in FIG. 20. The screen 117 includes an active vibration isolation frame information field 164 containing information on all registered active vibration isolation frames.

Figure 21:
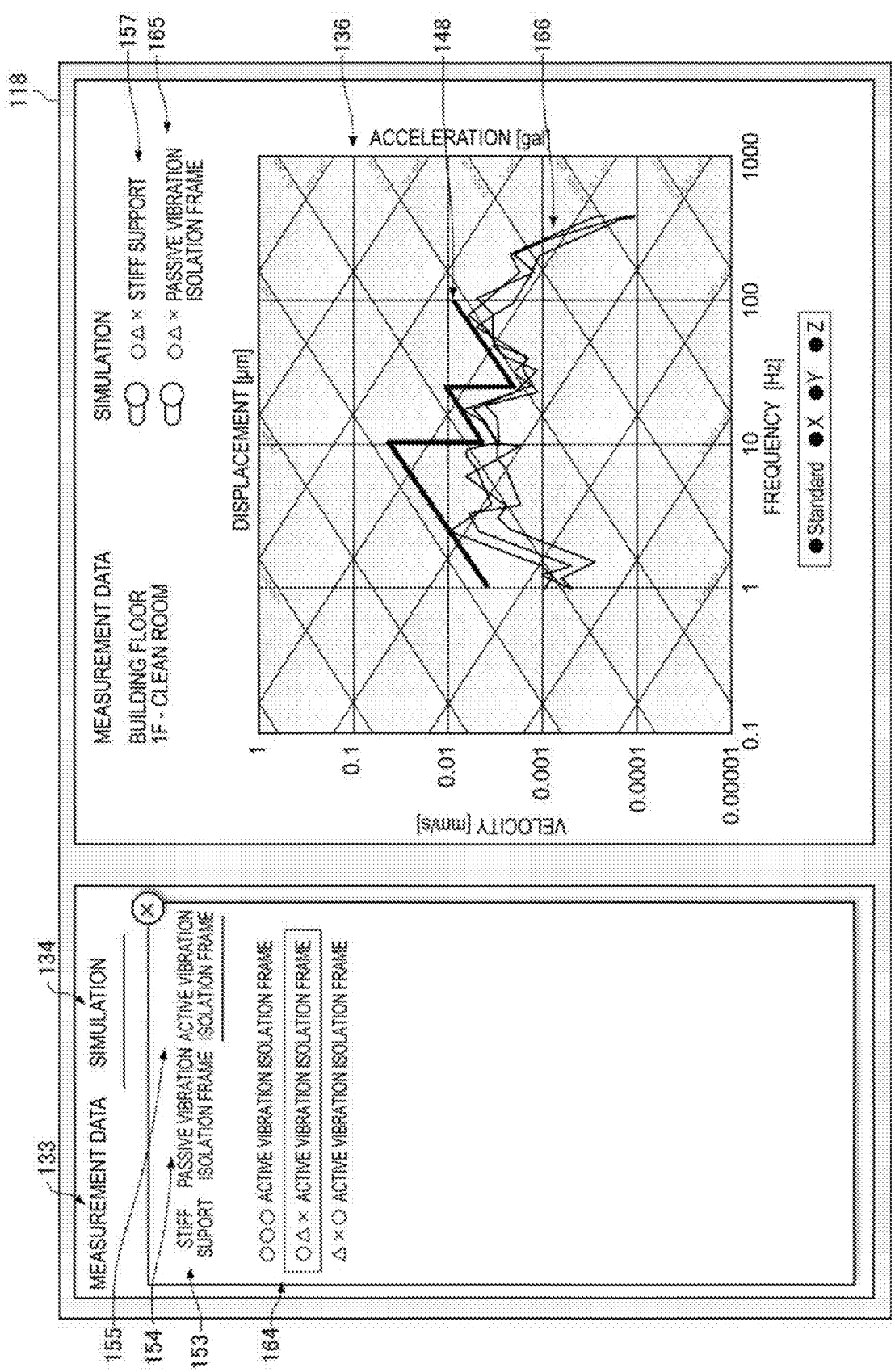
FIG. 21 is a view illustrating an example of a screen displayed on the display device.

When the user clicks on any of the active vibration isolation frames displayed in the active vibration isolation frame information field 164 on the screen 117 illustrated in FIG. 20, the clicked active vibration isolation frame is selected as the second support, and the screen 117 transitions to a screen 118 illustrated in FIG. 21. The screen 118 includes a selected-active vibration isolation frame information field 165 containing information on the selected active vibration isolation frame and vibration data 166 in each direction of the X-axis, the Y-axis, and the Z-axis plotted on the tripartite graph 136. The vibration data 166 refers to the third vibration information calculated by the diagnostic device 2 based on the second vibration information being the vibration data 158 included in the screen 113 illustrated in FIG. 16 and the vibration transfer characteristics of the selected active vibration isolation frame. The second diagnosis result including the tripartite graph 136 being a graph in which the allowable vibration standard line 148 as the index related to the vibration of the structural body 6 being the selected device and the vibration data 166 as the third vibration information are plotted is shown on the screen 118. The second diagnosis result is a diagnosis result when a stiff support selected as the first support and an active vibration isolation frame selected as the second support are installed between the building floor 5a and the structural body 6 being the selected device. The selected active vibration isolation frame has vibration transfer characteristics of attenuating the vibration at a frequency of 1 Hz to 100 Hz. Thus, the level of the vibration data 166 at the frequency of 1 Hz to 100 Hz is lower than that of the vibration data 158, and lower than the allowable vibration standard line 148. Thus, the user can determine that the stiff support displayed in the selected-stiff support information field 157 and the active vibration isolation frame displayed in the selected-active vibration isolation frame information field 165 are required to be installed between the building floor 5a and the structural body 6 being the selected device.

1-3. Configuration of Diagnostic Device

Figure 22:
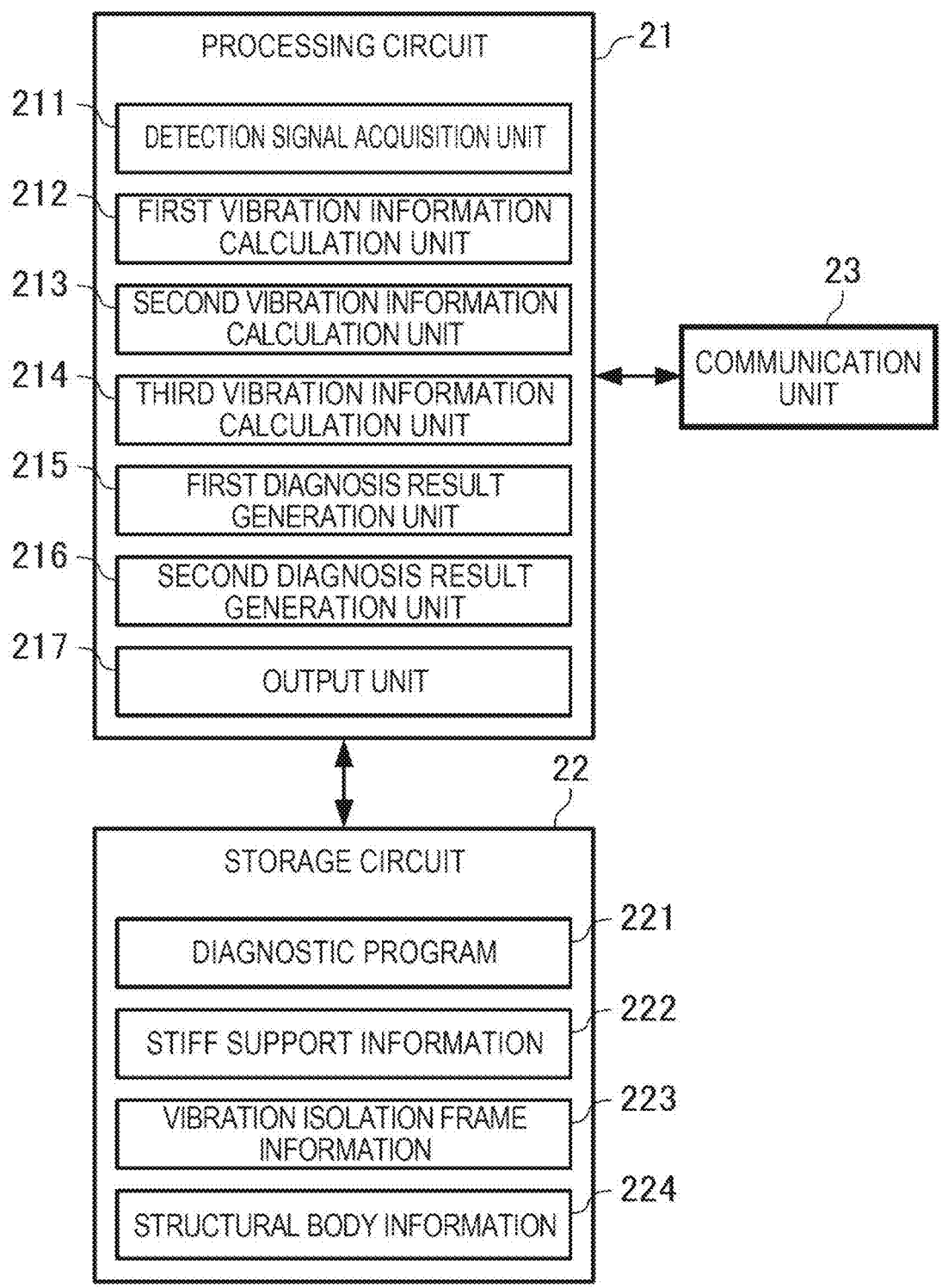
FIG. 22 is a diagram illustrating a configuration example of a diagnostic device according to a first embodiment.

FIG. 22 is a diagram illustrating a configuration example of the diagnostic device 2 in the first embodiment. As illustrated in FIG. 22, the diagnostic device 2 includes a processing circuit 21, a storage circuit 22, and a communication unit 23. The diagnostic device 2 may have a configuration in which some of the components in FIG. 22 are omitted or changed, or other components are added.

The processing circuit 21 acquires a detection signal output from the inertial sensor 4 and performs various calculation processes based on the acquired detection signal. The processing circuit 21 performs, for example, a process of controlling the communication unit 23 in order to perform data communication with the display device 3. The processing circuit 21 is realized by, for example, a CPU or a DSP. The CPU refers to a Central Processing Unit. The DSP is an abbreviation for a Digital Signal Processor.

The processing circuit 21 executes a diagnostic program 221 stored in the storage circuit 22 to function as a detection signal acquisition unit 211, a first vibration information calculation unit 212, a second vibration information calculation unit 213, a third vibration information calculation unit 214, a first diagnosis result generation unit 215, a second diagnosis result generation unit 216, and an output unit 217. That is, the diagnostic device 2 includes the detection signal acquisition unit 211, the first vibration information calculation unit 212, the second vibration information calculation unit 213, the third vibration information calculation unit 214, the first diagnosis result generation unit 215, the second diagnosis result generation unit 216, and the output unit 217.

The detection signal acquisition unit 211 acquires a detection signal obtained by detection of the inertial sensor 4 disposed on the floor 5 on which the structural body 6 is installed. For example, the detection signal acquisition unit 211 may acquire the detection signal from the inertial sensor 4, or may acquire a file in which data of the detection signal is written.

The first vibration information calculation unit 212 calculates first vibration information being information related to the vibration of the floor 5, based on the detection signal acquired by the detection signal acquisition unit 211.

The second vibration information calculation unit 213 calculates second vibration information being information related to the vibration on the structural body 6 when the first support is installed between the floor 5 and the structural body 6, based on the first vibration information calculated by the first vibration information calculation unit 212. Specifically, the second vibration information calculation unit 213 calculates the second vibration information being the information related to the vibration on the structural body 6 when the first support is installed between the floor 5 and the structural body 6, based on the first vibration information and the vibration transfer characteristics of the first support, which are prepared in advance. The first support may be a stiff support or a vibration isolation frame. For example, the vibration transfer characteristics of the first support are contained in the stiff support information 222 or the vibration isolation frame information 223 stored in the storage circuit 22.

The third vibration information calculation unit 214 calculates third vibration information being information related to the vibration on the structural body 6 when the first support and the second support are installed between the floor 5 and the structural body 6, based on the second vibration information calculated by the second vibration information calculation unit 213. Specifically, the third vibration information calculation unit 214 calculates the third vibration information being the information related to the vibration on the structural body 6 when the first support and the second support are installed between the floor 5 and the structural body 6, based on the second vibration information and the vibration transfer characteristics of the second support, which are prepared in advance. The first support may be a stiff support, and the second support may be a vibration isolation frame. For example, the vibration transfer characteristics of the second support are contained in the vibration isolation frame information 223 stored in the storage circuit 22.

The first diagnosis result generation unit 215 generates a first diagnosis result related to vibration damping on the structural body 6 when the first support is installed between the floor 5 and the structural body 6, based on the first support selected based on the first vibration information calculated by the first vibration information calculation unit 212, an index related to the vibration of the structural body 6, and information displayed on the display device 3. Specifically, the first diagnosis result generation unit 215 generates the first diagnosis result based on the second vibration information calculated by the second vibration information calculation unit 213. For example, the first diagnosis result may include a graph in which the index related to the vibration of the structural body 6 and the second vibration information are plotted.

The second diagnosis result generation unit 216 generates a second diagnosis result related to vibration damping on the structural body 6 when the first support and the second support are installed between the floor 5 and the structural body 6, based on the second support selected based on the second vibration information calculated by the second vibration information calculation unit 213, the index related to the vibration of the structural body 6, and the information displayed on the display device 3. Specifically, the second diagnosis result generation unit 216 generates the second diagnosis result based on the third vibration information calculated by the third vibration information calculation unit 214. For example, the second diagnosis result may include a graph in which the index related to the vibration of the structural body 6 and the third vibration information are plotted.

The output unit 217 outputs the first diagnosis result generated by the first diagnosis result generation unit 215 to the display device 3 via the communication unit 23. The output unit 217 outputs the second diagnosis result generated by the second diagnosis result generation unit 216 to the display device 3 via the communication unit 23. The output unit 217 outputs some pieces of information which are contained in stiff support information 222, vibration isolation frame information 223, and structural body information 224 (which are stored in the storage circuit 22) and are to be displayed on the display device 3, to the display device 3 via the communication unit 23.

The storage circuit 22 includes a ROM and a RAM (not illustrated). The ROM is an abbreviation for a Read Only Memory. The RAM is an abbreviation for a Random Access Memory. The ROM stores various programs such as the diagnostic program 221 and various types of data prepared in advance, such as the stiff support information 222, the vibration isolation frame information 223, and the structural body information 224. The stiff support information 222 is information such as the name, the dimensions, the weight resistance, and the vibration transfer characteristics of one or a plurality of stiff supports selectable as the first support. The vibration isolation frame information 223 is information such as the name, the dimensions, the weight resistance, and the vibration transfer characteristics of one or a plurality of vibration isolation frames selectable as the first support or the second support. The structural body information 224 is information such as the index related to the weight, the dimensions, and the vibration of one or a plurality of structural bodies selectable as the structural body 6. The RAM is used as a work area of the processing circuit 21. The RAM stores various types of data such as the program and data read out from the ROM, the detection signal acquired by the processing circuit 21, and the first vibration information, the second vibration information, the third vibration information, the first diagnosis result, and the second diagnosis result, which are generated by the processing circuit 21.

The communication unit 23 performs various controls for establishing data communication between the processing circuit 21 and the display device 3.

At least a portion of the processing circuit 21 may be realized by dedicated hardware. The diagnostic device 2 may be a single device or may be configured by a plurality of devices. The diagnostic device 2 may be, for example, a device such as a cloud server.

1-4. Configuration of Display Device

Figure 23:
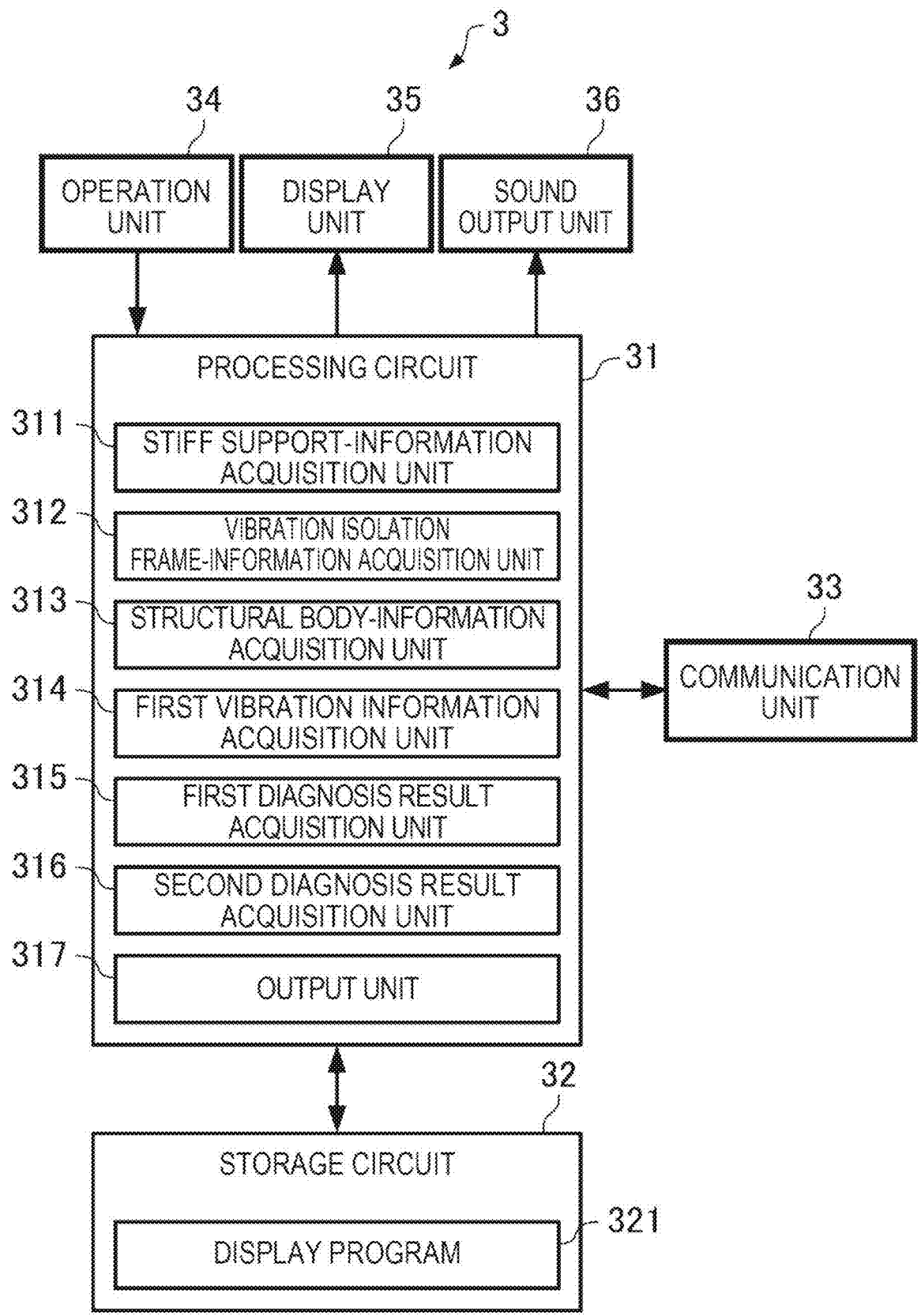
FIG. 23 is a diagram illustrating a configuration example of the display device.

FIG. 23 is a diagram illustrating a configuration example of the display device 3. As illustrated in FIG. 23, the display device 3 includes a processing circuit 31, a storage circuit 32, a communication unit 33, an operation unit 34, a display unit 35, and a sound output unit 36. The display device 3 may have a configuration in which some of the components in FIG. 23 are omitted or changed, or other components are added.

The processing circuit 31 performs data communication with the diagnostic device 2 via the communication unit 33, and performs a process of displaying various types of information on the display unit 35. Specifically, the processing circuit 31 executes a display program 321 stored in the storage circuit 32, and performs a process of outputting a display signal corresponding to various pieces of information acquired from the diagnostic device 2 via the communication unit 33, to the display unit 35. In addition, the processing circuit 31 performs various processes in accordance with operation signals from the operation unit 34, a process of transmitting sound signals for generating various sounds to the sound output unit 36, a process of controlling the communication unit 33 in order to perform data communication with the diagnostic device 2, and the like. The processing circuit 31 is realized by, for example, a CPU or a DSP.

The processing circuit 31 executes the display program 321 stored in the storage circuit 32 to function as a stiff support-information acquisition unit 311, a vibration isolation frame-information acquisition unit 312, a structural body-information acquisition unit 313, a first vibration information acquisition unit 314, a first diagnosis result acquisition unit 315, a second diagnosis result acquisition unit 316, and an output unit 317. That is, the display device 3 includes the stiff support-information acquisition unit 311, the vibration isolation frame-information acquisition unit 312, the structural body-information acquisition unit 313, the first vibration information acquisition unit 314, the first diagnosis result acquisition unit 315, the second diagnosis result acquisition unit 316, and the output unit 317.

The stiff support-information acquisition unit 311 acquires some types of information such as the name of each stiff support, which are contained in the stiff support information 222 from the diagnostic device 2 via the communication unit 33. Then, the stiff support-information acquisition unit 311 displays the acquired information on the display unit 35.

The vibration isolation frame-information acquisition unit 312 acquires some types of information such as the name of each vibration isolation frame, which are contained in the vibration isolation frame information 223 from the diagnostic device 2 via the communication unit 33. Then, the vibration isolation frame-information acquisition unit 312 displays the acquired information on the display unit 35.

The structural body-information acquisition unit 313 acquires some types of information such as the name of each structural body, which are contained in the structural body information 224 and some pieces of information such as the index related to the vibration, from the diagnostic device 2 via the communication unit 33. Then, the structural body-information acquisition unit 313 displays the acquired information on the display unit 35.

The first vibration information acquisition unit 314 acquires the first vibration information from the diagnostic device 2 via the communication unit 33, and displays the acquired first vibration information on the display unit 35.

The first diagnosis result acquisition unit 315 acquires the first diagnosis result from the diagnostic device 2 via the communication unit 33, and displays the acquired first diagnosis result on the display unit 35.

The second diagnosis result acquisition unit 316 acquires the second diagnosis result from the diagnostic device 2 via the communication unit 33, and displays the acquired second diagnosis result on the display unit 35.

The output unit 317 outputs necessary information in accordance with the operation signal from the operation unit 34, to the diagnostic device 2 via the communication unit 33. For example, the output unit 317 outputs information on the structural body selected as the structural body 6, information on the stiff support or the vibration isolation frame selected as the first support, information on the vibration isolation frame selected as the second support, and the like to the diagnostic device 2 via the communication unit 33.

The storage circuit 32 includes a ROM and a RAM (not illustrated). The ROM stores various programs such as the display program 321 and various types of data. The RAM is used as a work area of the processing circuit 31. The RAM stores various types of data such as the program and data read out from the ROM, data input from the operation unit 34, some pieces of information in the stiff support information 222 acquired by the processing circuit 31, some pieces of information in the vibration isolation frame information 223, some pieces of information in the structural body information 224, the first vibration information, the first diagnosis result, and the second diagnosis result.

The communication unit 33 performs various controls for establishing data communication between the processing circuit 31 and the diagnostic device 2.

The operation unit 34 is an input device configured by operation keys, button switches, and the like, and outputs an operation signal corresponding to an operation of the user, to the processing circuit 31.

The display unit 35 is configured by an LCD or the like, and displays various types of information based on the display signal output from the processing circuit 31. The LCD is an abbreviation for a Liquid Crystal Display. The display unit 35 may be provided with a touch panel that functions as the operation unit 34. For example, the display unit 35 displays, based on the display signal output from the processing circuit 31, some pieces of information in the stiff support information 222, which are used for causing the user to select a stiff support as the first support, some pieces of information in the vibration isolation frame information 223, which are used for causing the user to select a vibration isolation frame as the first support or the second support, some pieces of information in the structural body information 224, which are used for causing the user to select the structural body 6, the first vibration information, the first diagnosis result, the second diagnosis result, and the like.

The sound output unit 36 is configured by a speaker or the like, and generates various sounds based on the sound signal output from the processing circuit 31.

At least a portion of the processing circuit 31 may be realized by dedicated hardware. The display device 3 may be a single device or may be configured by a plurality of devices. The display device 3 may be, for example, a client terminal that performs data communication with the diagnostic device 2 such as a cloud server.

1-5. Diagnostic Method

Figure 24:
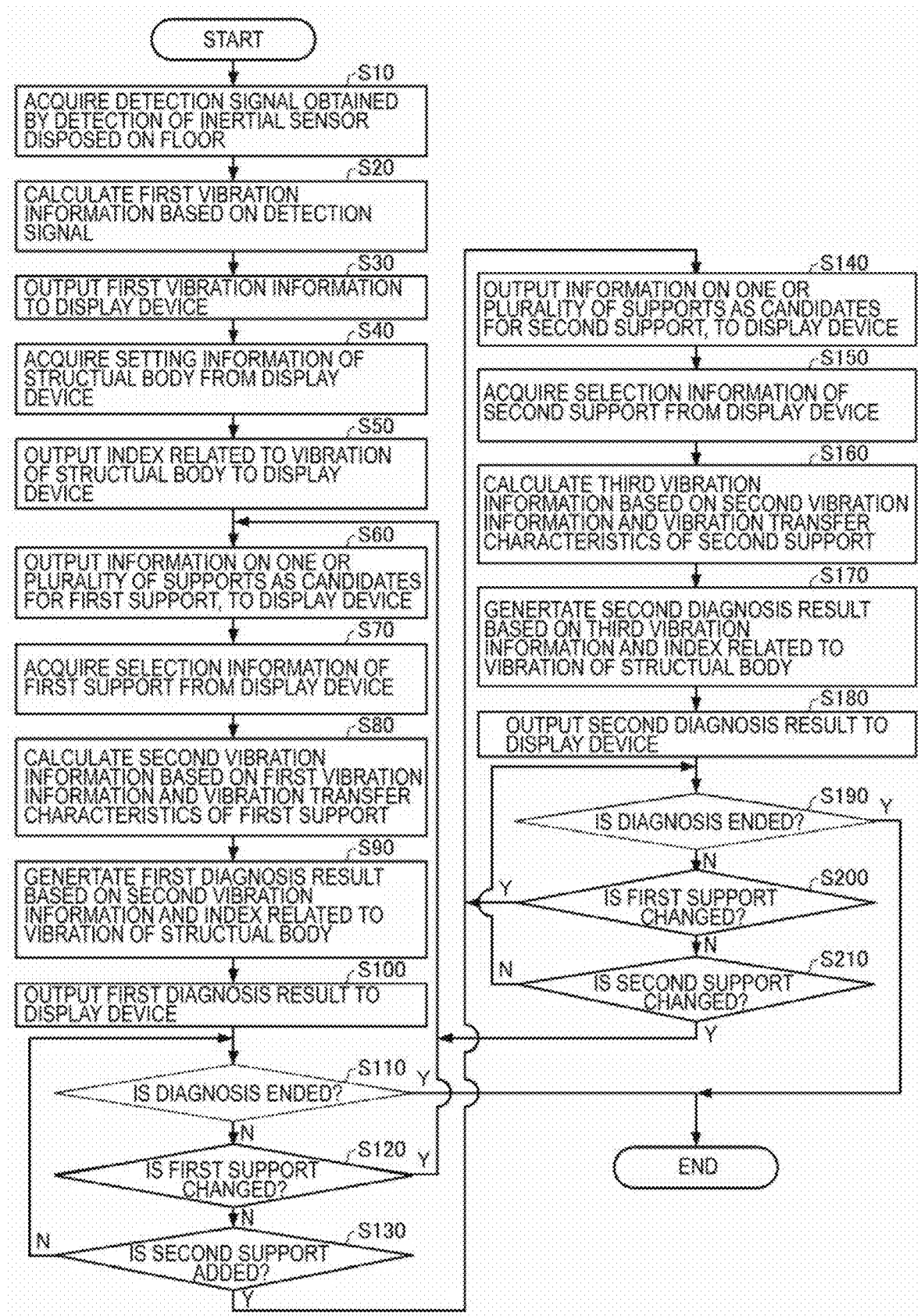
FIG. 24 is a flowchart illustrating an example of a procedure of a diagnostic method in the first embodiment.

FIG. 24 is a flowchart illustrating an example of a procedure of a diagnostic method performed by the diagnostic device 2.

As illustrated in FIG. 24, first, in Step S10, the diagnostic device 2 acquires a detection signal obtained by detection of the inertial sensor 4 disposed on the floor 5.

In Step S20, the diagnostic device 2 calculates first vibration information related to the vibration of the floor 5, based on the detection signal acquired in Step S10.

In Step S30, the diagnostic device 2 outputs the first vibration information calculated in Step S20 to the display device 3.

In Step S40, the diagnostic device 2 acquires setting information of the structural body 6 from the display device 3. The setting information of the structural body 6 contains information such as the name and the model number, which can be used for identifying the structural body set by the user.

In Step S50, the diagnostic device 2 outputs an index related to the vibration of the set structural body 6 to the display device 3. The index related to the vibration of the structural body 6 is, for example, an allowable vibration standard line of the structural body 6.

In Step S60, the diagnostic device 2 outputs information on one or a plurality of supports as candidates for the first support to the display device 3. When the first support is a stiff support, the diagnostic device 2 outputs information on one or a plurality of stiff supports as the candidates for the first support to the display device 3. When the first support is a vibration isolation frame, the diagnostic device 2 outputs information on one or a plurality of vibration isolation frames as the candidates for the first support to the display device 3.

In Step S70, the diagnostic device 2 acquires selection information of the first support from the display device 3. The selection information of the first support contains information such as the name and the model number, which can be used for identifying the first support selected by the user.

In Step S80, the diagnostic device 2 calculates second vibration information related to the vibration on the structural body 6 when the first support is installed between the floor 5 and the structural body 6, based on the first vibration information calculated in Step S30 and the vibration transfer characteristics of the selected first support.

In Step S90, the diagnostic device 2 generates a first diagnosis result related to vibration damping on the structural body 6 when the first support is installed between the floor 5 and the structural body 6, based on the second vibration information calculated in Step S80 and the index related to the vibration of the structural body 6. The first diagnosis result is, for example, a graph in which the index related to the vibration of the structural body 6 and the second vibration information are plotted.

In Step S100, the diagnostic device 2 outputs the first diagnosis result generated in Step S90 to the display device 3.

When the user performs an operation to end the diagnosis in Step S110, the diagnostic device 2 ends diagnostic processing. When the user does not perform the operation to end the diagnosis in Step S110 but performs an operation to request the change of the first support in Step S120, the diagnostic device 2 performs the process of Step S60 and the subsequent processes again. When the user does not perform the operation to end the diagnosis in Step S110 but performs an operation to add a second support in Step S130, the diagnostic device 2 performs the process of Step S140.

In Step S140, the diagnostic device 2 outputs information on one or a plurality of supports as candidates for the second support to the display device 3. When the first support is a stiff support and the second support is a vibration isolation frame, the diagnostic device 2 outputs information on one or a plurality of vibration isolation frames as the candidates for the second support to the display device 3.

In Step S150, the diagnostic device 2 acquires selection information of the second support from the display device 3. The selection information of the second support contains information such as the name and the model number, which can be used for identifying the second support selected by the user.

In Step S160, the diagnostic device 2 calculates third vibration information related to the vibration on the structural body 6 when the first support and the second support are installed between the floor 5 and the structural body 6, based on the second vibration information calculated in Step S80 and the vibration transfer characteristics of the selected second support.

In Step S170, the diagnostic device 2 generates a second diagnosis result related to vibration damping on the structural body 6 when the first support and the second support are installed between the floor 5 and the structural body 6, based on the third vibration information calculated in Step S160 and the index related to the vibration of the structural body 6. The second diagnosis result is, for example, a graph in which the index related to the vibration of the structural body 6 and the third vibration information are plotted.

In Step S180, the diagnostic device 2 outputs the second diagnosis result generated in Step S170 to the display device 3.

When the user performs the operation to end the diagnosis in Step S190, the diagnostic device 2 ends the diagnostic processing. When the user does not perform the operation to end the diagnosis in Step S190 but performs the operation to request the change of the second support in Step S200, the diagnostic device 2 performs the process of Step S140 and the subsequent processes again. When the user does not perform the operation to end the diagnosis in Step S190 but performs the operation to change the first support in Step S210, the diagnostic device 2 performs the process of Step S60 and the subsequent processes again.

1-6. Display Method

Figure 25:
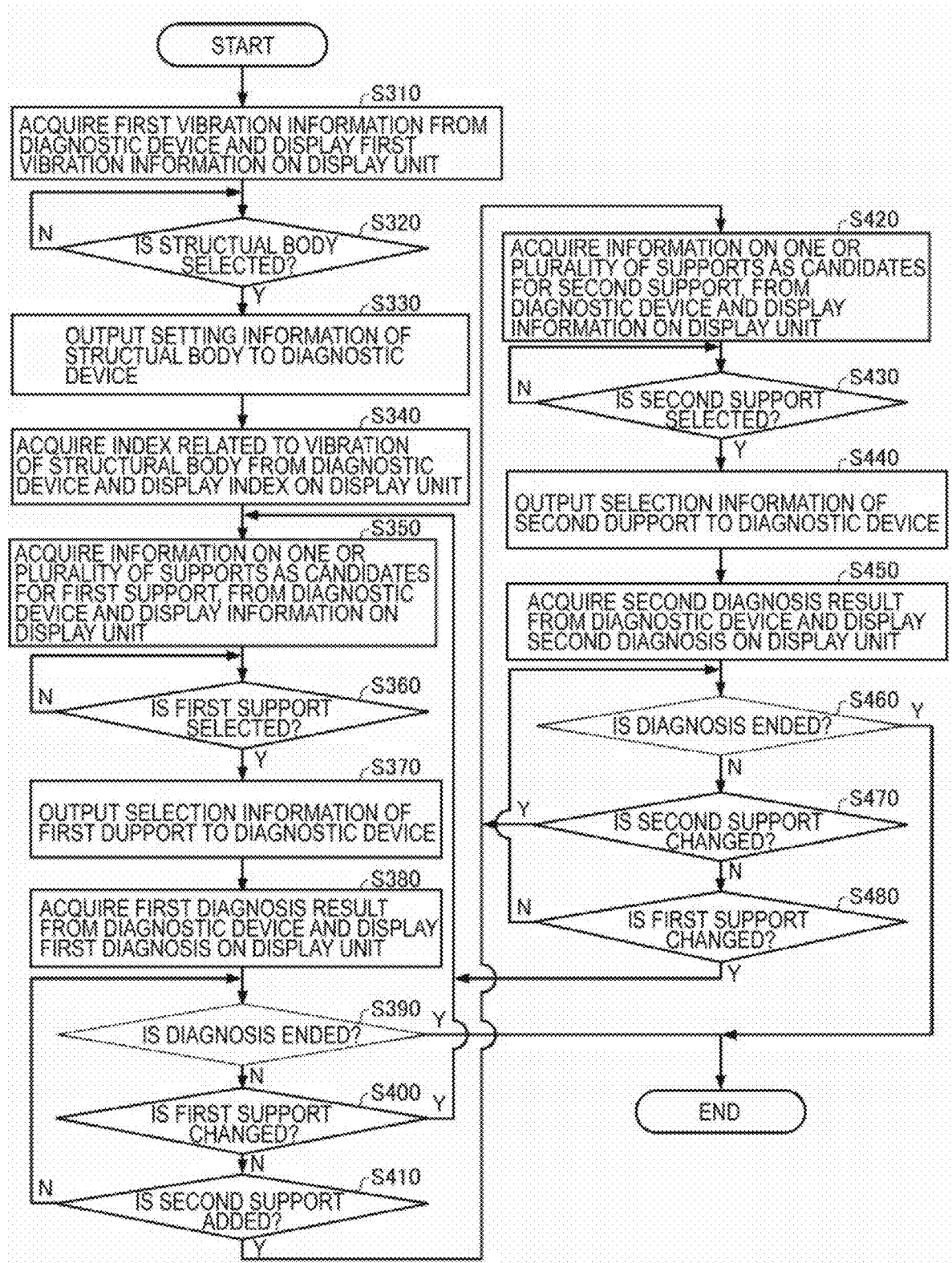
FIG. 25 is a flowchart illustrating an example of a procedure of a display method.

FIG. 25 is a flowchart illustrating an example of a procedure of a display method performed by the display device 3.

As illustrated in FIG. 25, first, in Step S310, the display device 3 acquires the first vibration information related to the vibration of the floor 5 from the diagnostic device 2 and displays the acquired first vibration information on the display unit 35.

When the structural body 6 is set by the user in the Step S320, the display device 3 outputs the setting information of the structural body 6 to the diagnostic device 2 in Step S330.

In Step S340, the display device 3 acquires an index related to the vibration of the set structural body 6 from the diagnostic device 2 and displays the acquired index on the display unit 35. For example, the display device displays a graph in which the index related to the vibration of the structural body 6 and the first vibration information are plotted, on the display unit 35.

In Step S350, the display device 3 acquires information on one or a plurality of supports as candidates for the first support from the diagnostic device 2, and displays the information on the display unit 35. That is, the display device 3 displays information for selecting the first support on the display unit 35. When the first support is a stiff support, information on one or a plurality of stiff supports as the candidates for the first support is displayed on the display unit 35. When the first support is a vibration isolation frame, information on one or a plurality of vibration isolation frames as the candidates for the first support is displayed on the display unit 35.

When the first support is selected by the user in Step S360, the display device 3 outputs selection information of the first support to the diagnostic device 2 in Step S370.

In Step S380, the display device 3 acquires the first diagnosis result related to vibration damping on the structural body 6 when the first support is installed between the floor 5 and the structural body 6, from the diagnostic device 2. Then, the display device displays the acquired first diagnosis result on the display unit 35. For example, a graph in which the index related to the vibration of the structural body 6 and the second vibration information are plotted is displayed as the first diagnosis result on the display unit 35.

When the user performs the operation to end the diagnosis in Step S390, the display device 3 ends the display processing. When the user does not perform the operation to end the diagnosis in Step S390 but performs the operation to request the change of the first support in Step S400, the display device 3 performs the process of Step S350 and the subsequent processes again. When the user does not perform the operation to end the diagnosis in Step S390 but performs the operation to add a second support in Step S410, the display device 3 performs the process of Step S420.

In Step S420, the display device 3 acquires information on one or a plurality of supports as candidates for the second support from the diagnostic device 2, and displays the acquired information on the display unit 35. That is, the display device 3 displays information for selecting the second support on the display unit 35. When the first support is a stiff support and the second support is a vibration isolation frame, information on one or a plurality of vibration isolation frames as the candidates for the second support is displayed on the display unit 35.

When the second support is selected by the user in Step S430, the display device 3 outputs selection information of the second support to the diagnostic device 2 in Step S440.

In Step S450, the display device 3 acquires a second diagnosis result related to vibration damping on the structural body 6 when the first support and the second support are installed between the floor 5 and the structural body 6, from the diagnostic device 2. Then, the display device displays the acquired second diagnosis result on the display unit 35. For example, a graph in which the index related to the vibration of the structural body 6 and the third vibration information are plotted is displayed as the second diagnosis result on the display unit 35.

When the user performs the operation to end the diagnosis in Step S460, the display device 3 ends display processing. When the user does not perform the operation to end the diagnosis in Step S460 but performs the operation to request the change of the second support in Step S470, the display device 3 performs the process of Step S420 and the subsequent processes again. When the user does not perform the operation to end the diagnosis in Step S460 but performs an operation to add the first support in Step S480, the display device 3 performs the process of Step S350 again.

1-7. Advantageous Effects

As described above, in the first embodiment, the display device 3 displays the first diagnosis result related to vibration damping on the structural body 6 when the first support selected by the user based on the information displayed on the display device 3 is installed between the floor 5 and the structural body 6. Thus, according to the first embodiment, the user can determine whether or not the level of the vibration transferred to the structural body 6 when the first support is selected may be allowable, based on the first diagnosis result.

According to the first embodiment, when the first support is a stiff support, the first diagnosis result related to vibration damping on the structural body 6 when the stiff support selected as the first support is installed between the floor 5 and the structural body 6 is obtained. Thus, the user can determine whether or not the stiff support selected as the first support is appropriate, based on the first diagnosis result. Further, the user can determine whether or not it is necessary to reduce the vibration transferred to the structural body 6 by further installing a vibration isolation frame. When the first support is a vibration isolation frame, the first diagnosis result related to vibration damping on the structural body 6 when the vibration isolation frame selected as the first support is installed between the floor 5 and the structural body 6 is obtained. Thus, the user can determine whether or not the vibration isolation frame selected as the first support is appropriate, based on the first diagnosis result.

Further, according to the first embodiment, the first diagnosis result can be obtained based on the vibration transfer characteristics of the first support, which are prepared in advance. Thus, the user can determine whether or not the level of the vibration transferred to the structural body 6 can be allowed, without actually measuring the vibration transferred to the structural body 6 in a state where the first support is installed between the floor 5 and the structural body 6.

Further, according to the first embodiment, the display device 3 displays the first diagnosis result including the graph in which the index related to the vibration of the structural body 6 and the second vibration information related to the vibration on the structural body 6 when the first support is installed between the floor 5 and the structural body 6 are plotted. Thus, the user can easily compare the index related to the vibration of the structural body 6 with the level of the vibration transferred to the structural body 6, based on the visualized graph, and can easily recognize the optimum support as the first support.

In the first embodiment, the display device 3 displays the second diagnosis result related to vibration damping on the structural body 6 when the first support and the second support selected by the user based on the information displayed on the display device 3 are installed between the floor 5 and the structural body 6. Thus, according to the first embodiment, the user can determine whether or not the level of the vibration transferred to the structural body 6 when the first support and the second support are selected may be allowable, based on the second diagnosis result.

Further, according to the first embodiment, when the first support is a stiff support and the second support is a vibration isolation frame, the second diagnosis result related to vibration damping on the structural body 6 when the vibration isolation frame selected as the second support is installed between the floor 5 and the structural body 6 together with the stiff support selected as the first support can be obtained. Thus, the user can determine whether or not the stiff support selected as the first support and the vibration isolation frame selected as the second support are appropriate, based on the second diagnosis result.

Further, according to the first embodiment, the second diagnosis result can be obtained based on the vibration transfer characteristics of the second support, which are prepared in advance. Thus, the user can determine whether or not the level of the vibration transferred to the structural body 6 can be allowed, without actually measuring the vibration transferred to the structural body 6 in a state where the first support and the second support are installed between the floor 5 and the structural body 6.

Further, according to the first embodiment, the display device 3 displays the second diagnosis result including the graph in which the index related to the vibration of the structural body 6 and the third vibration information related to the vibration on the structural body 6 when the first support and the second support are installed between the floor 5 and the structural body 6 are plotted. Accordingly, the user can easily compare the index related to the vibration of the structural body 6 with the level of the vibration transferred to the structural body 6, based on the visualized graph, and can easily recognize the optimum support as the first support and the optimum support as the second support.

2. Second Embodiment

A second embodiment will be described below focusing on contents different from the first embodiment. In the second embodiment, components similar to those in the first embodiment are denoted by the same reference signs, and the description overlapping with the first embodiment will be omitted or simplified.

Figure 26:
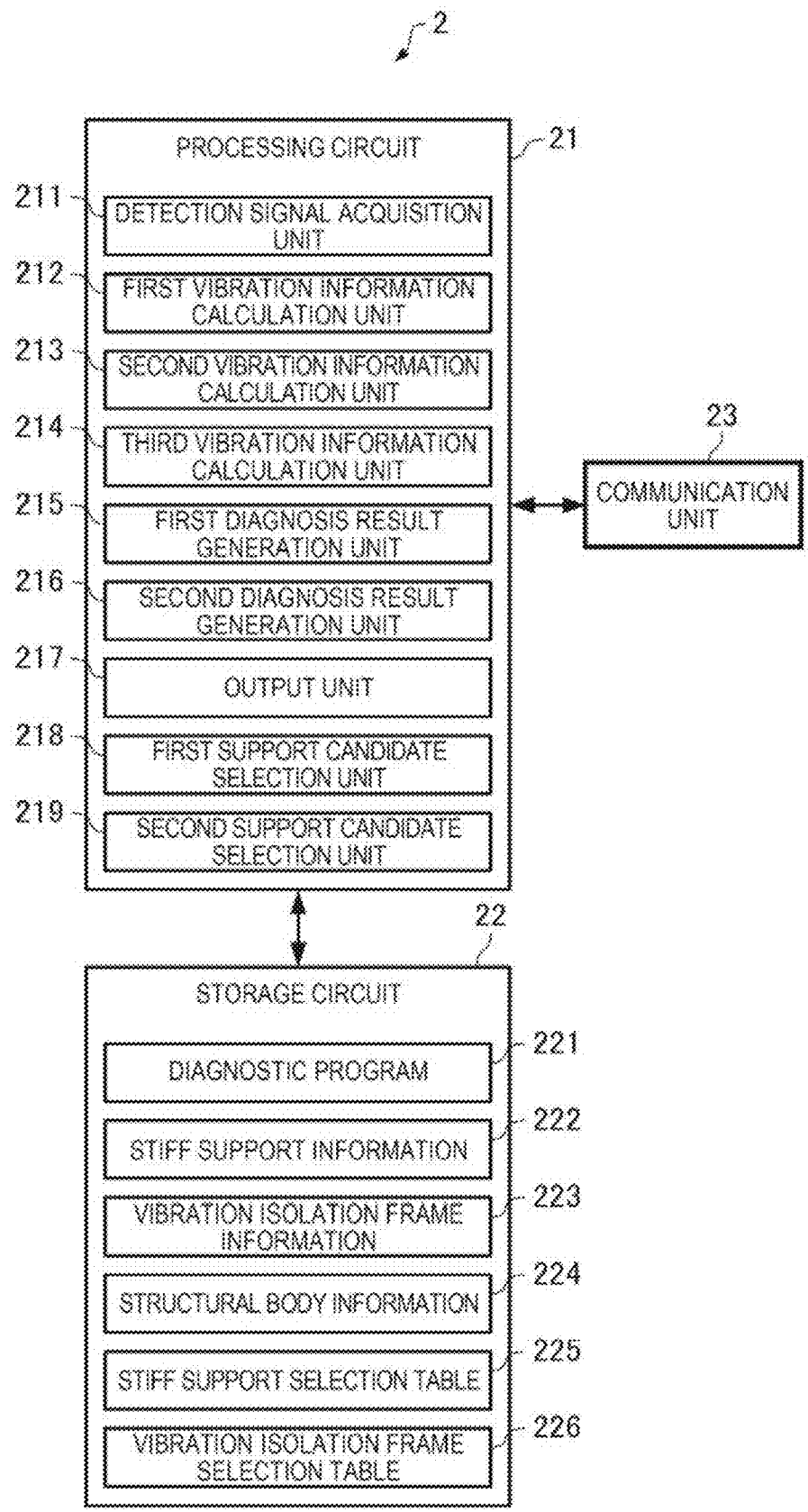
FIG. 26 is a diagram illustrating a configuration example of a diagnostic device according to a second embodiment.

FIG. 26 is a diagram illustrating a configuration example of a diagnostic device 2 according to the second embodiment. As illustrated in FIG. 26, the diagnostic device 2 in the second embodiment includes a processing circuit 21, a storage circuit 22, and a communication unit 23, similar to the first embodiment. The diagnostic device 2 may have a configuration in which some of the components in FIG. 26 are omitted or changed, or other components are added.

In the second embodiment, similar to the first embodiment, a diagnostic program 221, stiff support information 222, vibration isolation frame information 223, and structural body information 224 are stored in the storage circuit 22. A stiff support selection table 225 and a vibration isolation frame selection table 226 are further stored in the storage circuit 22.

The stiff support selection table 225 is a table for defining the correspondence between a vibration level, a value of the index related to the vibration of the structural body 6, and one or a plurality of stiff supports. The vibration level refers to a vibration level in a place where each stiff support is installed. For example, the vibration level may be the average value or the maximum value of the vibration levels at 1 Hz to 100 Hz, or a combination of the average value or the maximum value of the vibration levels at 1 Hz to 10 Hz and the average value or the maximum value of the vibration levels at 10 Hz to 100 Hz. The index related to the vibration of the structural body 6 is, for example, an allowable vibration standard line. The index may be a combination of the average value or the maximum value of the standard values at 1 Hz to 10 Hz and the average value or the maximum value of the standard values at 10 Hz to 100 Hz. In general, it is not possible that the stiff support reduces the vibration level. Therefore, for example, in the stiff support selection table 225, as a difference between the vibration level and the index becomes smaller, a stiff support having a vibration transfer rate which becomes closer to 1 is associated.

FIG. 27 is a diagram illustrating an example of the stiff support selection table 225. In the example of FIG. 27, for example, the vibration level Lv1 or Lv2, the value St1 of the index, and stiff supports of Nos. 1 to 3 are associated with each other. In the example of FIG. 27, when the combination of the vibration level and the index value is different, the associated stiff support is also different, but some stiff supports may be common even though the combination of the vibration level and the index value is different. For example, with respect to the example of FIG. 27, the vibration level Lv1 or Lv2, the value St1 of the index, and stiff supports of Nos. 1 to 4 may be associated with each other, and the vibration level Lv1 or Lv2, the value St2 of the index, and stiff supports of Nos. 3 to 6 may be associated with each other. In this case, the stiff supports of Nos. 3 and 4 are common stiff supports.

The vibration isolation frame selection table 226 is a table for defining the correspondence between the vibration level, the value of the index related to the vibration of the structural body 6, and one or a plurality of vibration isolation frames. The vibration level refers to a vibration level in a place where each vibration isolation frame is installed. For example, the vibration level may be the average value or the maximum value of the vibration levels at 1 Hz to 100 Hz, or a combination of the average value or the maximum value of the vibration levels at 1 Hz to 10 Hz and the average value or the maximum value of the vibration levels at 10 Hz to 100 Hz. The index related to the vibration of the structural body 6 is, for example, an allowable vibration standard line. The index may be a combination of the average value or the maximum value of the standard values at 1 Hz to 10 Hz and the average value or the maximum value of the standard values at 10 Hz to 100 Hz. For example, in the vibration isolation frame selection table 226, as the difference between the vibration level and the index becomes greater, a vibration isolation frame having a larger vibration damping rate is associated. Alternatively, when the vibration level at 1 Hz to 10 Hz is larger than the index, and the vibration level at 10 Hz to 100 Hz is smaller than the index, a vibration isolation frame in which the vibration damping rate is large at 1 Hz to 10 Hz may be associated.

FIG. 28 is a diagram illustrating an example of the vibration isolation frame selection table 226. In the example of FIG. 28, for example, the vibration level Lv1 or Lv2, the value St1 of the index, and vibration isolation frames of Nos. 1 to 3 are associated with each other. In the example of FIG. 28, when the combination of the vibration level and the index value is different, the associated vibration isolation frame is also different, but some vibration isolation frames may be common even though the combination of the vibration level and the index value is different. For example, with respect to the example of FIG. 28, the vibration level Lv1 or Lv2, the value St1 of the index, and vibration isolation frames of Nos. 1 to 4 may be associated with each other, and the vibration level Lv1 or Lv2, the value St2 of the index, and vibration isolation frames of Nos. 3 to 6 may be associated with each other. In this case, the vibration isolation frames of Nos. 3 and 4 are common stiff supports.

Returning to the description of FIG. 26, the processing circuit 21 executes a diagnostic program 221 stored in the storage circuit 22 to function as a detection signal acquisition unit 211, a first vibration information calculation unit 212, a second vibration information calculation unit 213, a third vibration information calculation unit 214, a first diagnosis result generation unit 215, a second diagnosis result generation unit 216, an output unit 217, a first support candidate selection unit 218, and a second support candidate selection unit 219. That is, the diagnostic device 2 in the second embodiment includes the detection signal acquisition unit 211, the first vibration information calculation unit 212, the second vibration information calculation unit 213, the third vibration information calculation unit 214, the first diagnosis result generation unit 215, the second diagnosis result generation unit 216, the output unit 217, the first support candidate selection unit 218, and the second support candidate selection unit 219. The functions of the detection signal acquisition unit 211, the first vibration information calculation unit 212, the second vibration information calculation unit 213, the third vibration information calculation unit 214, the first diagnosis result generation unit 215, the second diagnosis result generation unit 216 are similar to those in the first embodiment. Thus, the description thereof will be omitted.

The first support candidate selection unit 218 selects one or a plurality of supports as candidates for a first support based on a first table and first vibration information calculated by the first vibration information calculation unit 212. The first table is for defining the correspondence between the vibration level, the value of the index related to the vibration of a structural body 6, and the one or plurality of supports as the candidates for the first support. For example, the first support candidate selection unit 218 selects, as the candidates for the first support, one or a plurality of supports associated with the vibration level calculated from the first vibration information and the value of the index related to the vibration of the structural body 6 in the first table. When the first support is a stiff support, the first table is the stiff support selection table 225. When the first support is a vibration isolation frame, the first table is the vibration isolation frame selection table 226.

The second support candidate selection unit 219 selects one or a plurality of supports as candidates for a second support based on a second table and second vibration information calculated by the second vibration information calculation unit 213. The second table is for defining the correspondence between the vibration level, the value of the index related to the vibration of the structural body 6, and the one or plurality of supports as the candidates for the second support. For example, the second support candidate selection unit 219 selects, as the candidates for the second support, one or a plurality of supports associated with the vibration level calculated from the second vibration information and the value of the index related to the vibration of the structural body 6 in the second table. When the first support is a stiff support and the second support is a vibration isolation frame, the second table is the vibration isolation frame selection table 226.

The output unit 217 outputs, to a display device 3, the information on the one or plurality of supports as the candidates for the first support, which are selected by the first support candidate selection unit 218. The output unit 217 outputs, to the display device 3, the information on the one or plurality of supports as the candidates for the second support, which are selected by the second support candidate selection unit 219.

Other configurations of the diagnostic device 2 in the second embodiment are similar to those in the first embodiment, and thus the description thereof will be omitted. Further, since the configuration of the display device 3 in the second embodiment is similar to that in the first embodiment, the description thereof will be omitted.

Figure 29:
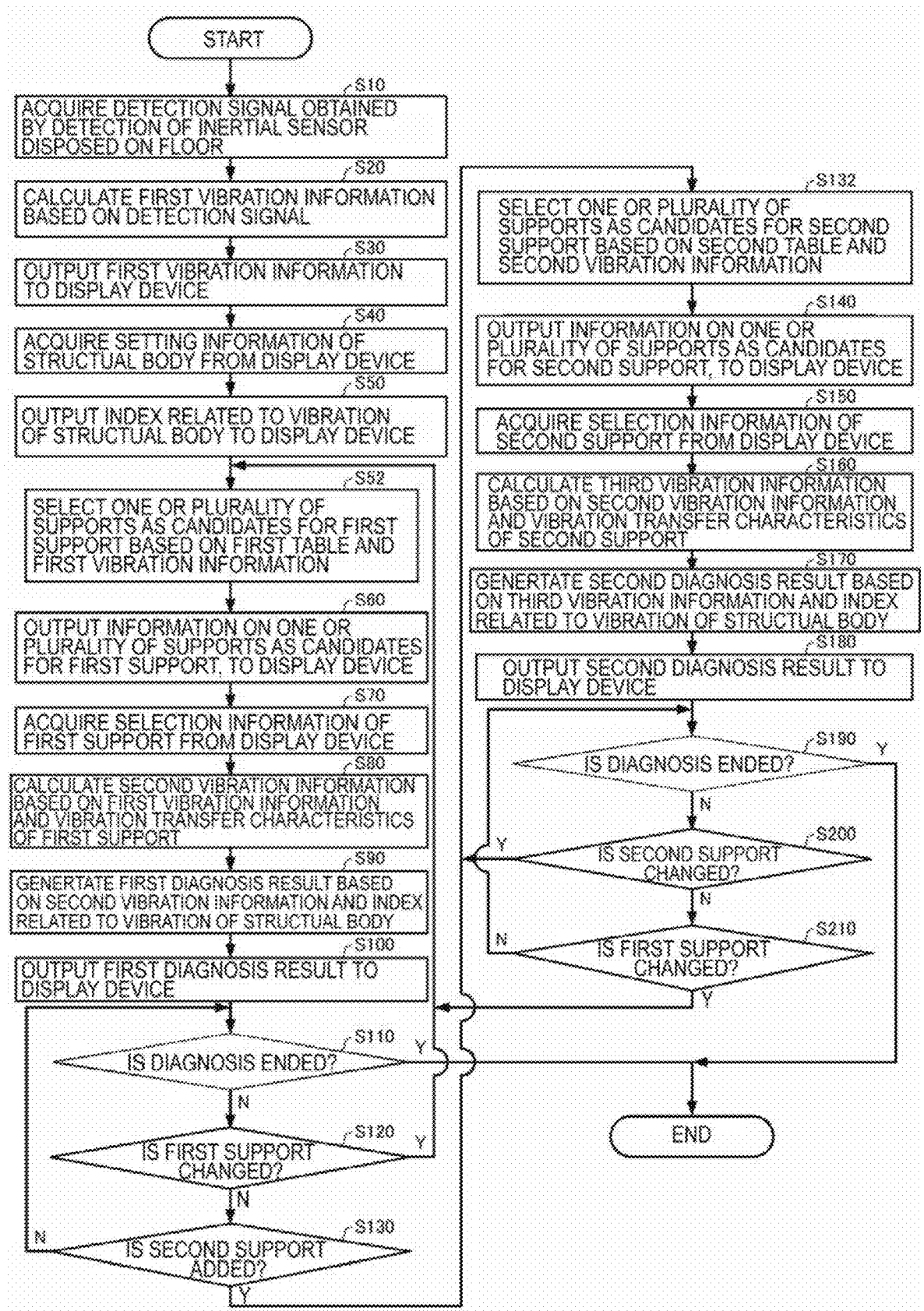
FIG. 29 is a flowchart illustrating an example of a procedure of a diagnostic method in the second embodiment.

FIG. 29 is a flowchart illustrating an example of a procedure of a diagnostic method performed by the diagnostic device 2 in the second embodiment. In FIG. 29, the same steps as those in FIG. 24 are denoted by the same reference signs, and the description thereof will be omitted.

In the procedure illustrated in FIG. 29, Step S52 is added between Steps S50 and S60, and Step S132 is added between Steps S130 and S140, in the procedure illustrated in FIG. 24.

First, the diagnostic device 2 performs Steps S10 to S50 in order. Then, in Step S52, the diagnostic device selects one or a plurality of supports as the candidates for the first support, based on the first table and the first vibration information calculated in Step S20. When the first support is a stiff support, the diagnostic device 2 refers to the stiff support selection table 225 as the first table to select one or a plurality of stiff supports as the candidates for the first support. When the first support is a vibration isolation frame, the diagnostic device 2 refers to the vibration isolation frame selection table 226 as the first table to select one or a plurality of vibration isolation frames as the candidates for the first support.

In Step S60, the diagnostic device 2 outputs information on the one or plurality of supports selected as candidates for the first support in Step S52, to the display device 3.

Then, when the diagnostic device 2 performs Steps S70 to S100 in order and then the user performs an operation to end the diagnosis in the Step S110, the diagnostic device 2 ends diagnostic processing. When the user does not perform the operation to end the diagnosis in Step S110 but performs an operation to request the change of the first support in Step S120, the diagnostic device 2 performs the process of Step S52 and the subsequent processes again. When the user does not perform the operation to end the diagnosis in Step S110 but performs an operation to add a second support in Step S130, the diagnostic device 2 performs the process of Step S132.

In Step S132, the diagnostic device 2 selects one or a plurality of supports as candidates for the second support, based on the second table and the second vibration information calculated in Step S80. When the first support is a stiff support and the second support is a vibration isolation frame, the diagnostic device 2 refers to the vibration isolation frame selection table 226 as the second table to select the one or plurality of vibration isolation frames as the candidates for the second support.

In Step S140, the diagnostic device 2 outputs information on the one or plurality of supports selected as the candidates for the second support in Step S132, to the display device 3.

Then, when the diagnostic device 2 performs Steps S150 to S180 in order and then the user performs the operation to end the diagnosis in the Step S190, the diagnostic device ends the diagnostic processing. When the user does not perform the operation to end the diagnosis in Step S190 but performs the operation to request the change of the second support in Step S200, the diagnostic device 2 performs the process of Step S132 and the subsequent processes again. When the user does not perform the operation to end the diagnosis in Step S190 but performs the operation to change the first support in Step S210, the diagnostic device 2 performs the process of Step S52 and the subsequent processes again.

A procedure of a display method performed by the display device 3 in the second embodiment is similar to that in FIG. 25, and thus the illustration and description thereof will be omitted.

According to the second embodiment described above, it is possible to exhibit effects similar to those in the first embodiment.

Further, in the second embodiment, the diagnostic device 2 selects one or a plurality of supports as the candidates for the first support, based on the first table for defining the correspondence between the vibration level, the value of the index related to the vibration of the structural body 6, and one or a plurality of supports as the candidates for the first support. The display device 3 displays information on one or a plurality of supports as the candidates for the first support. Thus, according to the second embodiment, it is possible to present, to the user, one or a plurality of supports appropriate as the candidates for the first support, based on the relation between the first vibration information related to the vibration of the floor 5 and the index related to the vibration of the structural body 6.

Further, in the second embodiment, the diagnostic device 2 selects one or a plurality of supports as the candidates for the second support, based on the second table for defining the correspondence between the vibration level, the value of the index related to the vibration of the structural body 6, and one or a plurality of supports as the candidates for the second support. The display device 3 displays information on one or a plurality of supports as the candidates for the second support. Thus, according to the second embodiment, it is possible to present, to the user, one or a plurality of supports appropriate as the candidates for the second support, based on the relation between the second vibration information related to the vibration on the structural body 6 when the first support is installed between the floor 5 and the structural body 6, and the index related to the vibration of the structural body 6.

3. Third Embodiment

A third embodiment will be described below focusing on contents different from the first embodiment or the second embodiment. In the third embodiment, components similar to those in the first embodiment or the second embodiment are denoted by the same reference signs, and the description overlapping with the first embodiment or the second embodiment will be omitted or simplified.

Figure 30:
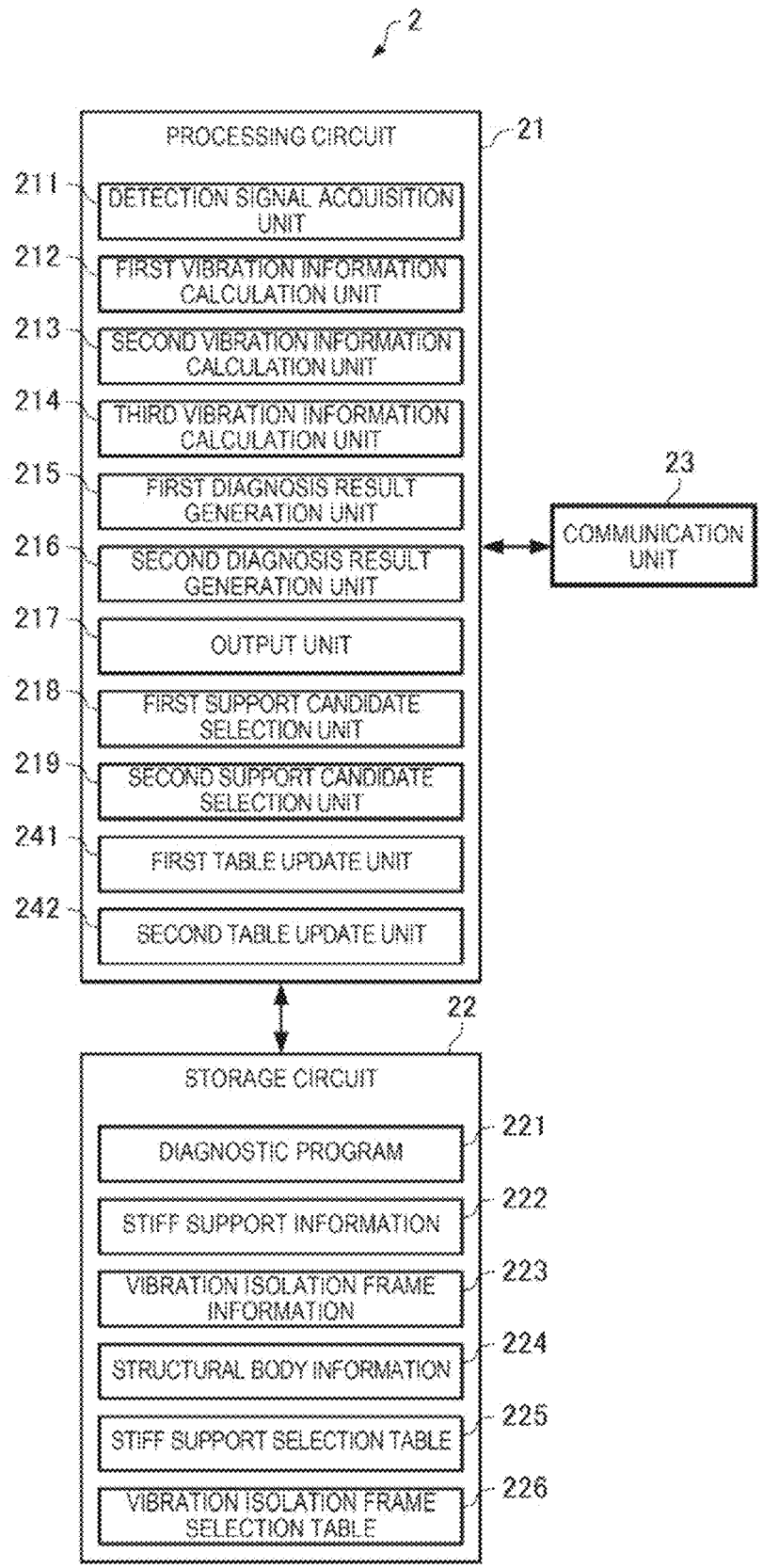
FIG. 30 is a diagram illustrating a configuration example of a diagnostic device according to a third embodiment.

FIG. 30 is a diagram illustrating a configuration example of a diagnostic device 2 according to the third embodiment.

As illustrated in FIG. 30, the diagnostic device 2 in the third embodiment includes a processing circuit 21, a storage circuit 22, and a communication unit 23, similar to the first embodiment or the second embodiment. The diagnostic device 2 may have a configuration in which some of the components in FIG. 30 are omitted or changed, or other components are added.

In the third embodiment, the processing circuit 21 executes a diagnostic program 221 stored in the storage circuit 22 to function as a detection signal acquisition unit 211, a first vibration information calculation unit 212, a second vibration information calculation unit 213, a third vibration information calculation unit 214, a first diagnosis result generation unit 215, a second diagnosis result generation unit 216, an output unit 217, a first support candidate selection unit 218, a second support candidate selection unit 219, a first table update unit 241, and a second table update unit 242. That is, the diagnostic device 2 in the third embodiment includes the detection signal acquisition unit 211, the first vibration information calculation unit 212, the second vibration information calculation unit 213, the third vibration information calculation unit 214, the first diagnosis result generation unit 215, the second diagnosis result generation unit 216, the output unit 217, the first support candidate selection unit 218, the second support candidate selection unit 219, the first table update unit 241, and the second table update unit 242. The functions of the detection signal acquisition unit 211, the first vibration information calculation unit 212, the second vibration information calculation unit 213, the third vibration information calculation unit 214, the first diagnosis result generation unit 215, the second diagnosis result generation unit 216 are similar to those in the first embodiment. Thus, the description thereof will be omitted. The functions of the first support candidate selection unit 218 and the second support candidate selection unit 219 are similar to those in the second embodiment, and thus the description thereof will be omitted.

When a support different from all of the one or plurality of supports as the candidates for the first support, which are selected by the first support candidate selection unit 218 is selected as the first support, the first table update unit 241 updates the first table. For example, the first table update unit 241 may add a support selected by the user as the first support, to one or a plurality of supports associated with the vibration level calculated from the first vibration information and the value of the index related to the vibration of the set structural body 6 in the first table. When the first support is a stiff support, the first table is the stiff support selection table 225. When the first support is a vibration isolation frame, the first table is the vibration isolation frame selection table 226.

FIG. 31 is a diagram illustrating an update example of the stiff support selection table 225 as the first table. In the example of FIG. 27 illustrated above, the vibration level Lv3 or Lv4, the value St3 of the index, and stiff supports of Nos. 19 to 21 are associated with each other. Thus, when the vibration level calculated from the first vibration information is Lv3 or Lv4, and the value of the index related to the vibration of the set structural body 6 is St3, the first support candidate selection unit 218 selects the stiff supports of Nos. 19 to 21, as the candidates for the first support. Meanwhile, when the user selects the stiff support of No. 31 different from the stiff supports of Nos. 19 to 21, as the first support, as illustrated by shading in FIG. 31, the first table update unit 241 updates the stiff support selection table 225 as the first table so that the vibration level Lv3 or Lv4, the value St3 of the index, and the stiff supports of Nos. 19 to 21 and 31 are associated with each other.

When a support different from all of the one or plurality of supports as the candidates for the second support, which are selected by the second support candidate selection unit 219 is selected as the second support, the second table update unit 242 updates the second table. For example, the second table update unit 242 may add a support selected by the user as the second support, to one or a plurality of supports associated with the vibration level calculated from the second vibration information and the value of the index related to the vibration of the set structural body 6 in the second table. When the first support is a stiff support and the second support is a vibration isolation frame, the second table is the vibration isolation frame selection table 226.

FIG. 32 is a diagram illustrating an update example of the vibration isolation frame selection table 226 as the second table. In the example of FIG. 28 illustrated above, the vibration level Lv3 or Lv4, the value St2 of the index, and vibration isolation frames of Nos. 16 to 18 are associated with each other. Thus, when the vibration level calculated from the second vibration information is Lv3 or Lv4, and the value of the index related to the vibration of the set structural body 6 is St2, the second support candidate selection unit 219 selects the vibration isolation frames of Nos. 16 to 18, as the candidates for the second support. Meanwhile, when the user selects the vibration isolation frame of No. 28 different from the vibration isolation frames of Nos. 16 to 18, as the second support, as illustrated by shading in FIG. 32, the second table update unit 242 updates the vibration isolation frame selection table 226 as the second table so that the vibration level Lv3 or Lv4, the value St2 of the index, and the vibration isolation frames of Nos. 16 to 18 and 28 are associated with each other.

Other configurations of the diagnostic device 2 in the third embodiment are similar to those in the first embodiment or the second embodiment, and thus the description thereof will be omitted. Further, since the configuration of the display device 3 in the third embodiment is similar to that in the first embodiment or the second embodiment, the description thereof will be omitted.

Figure 33:
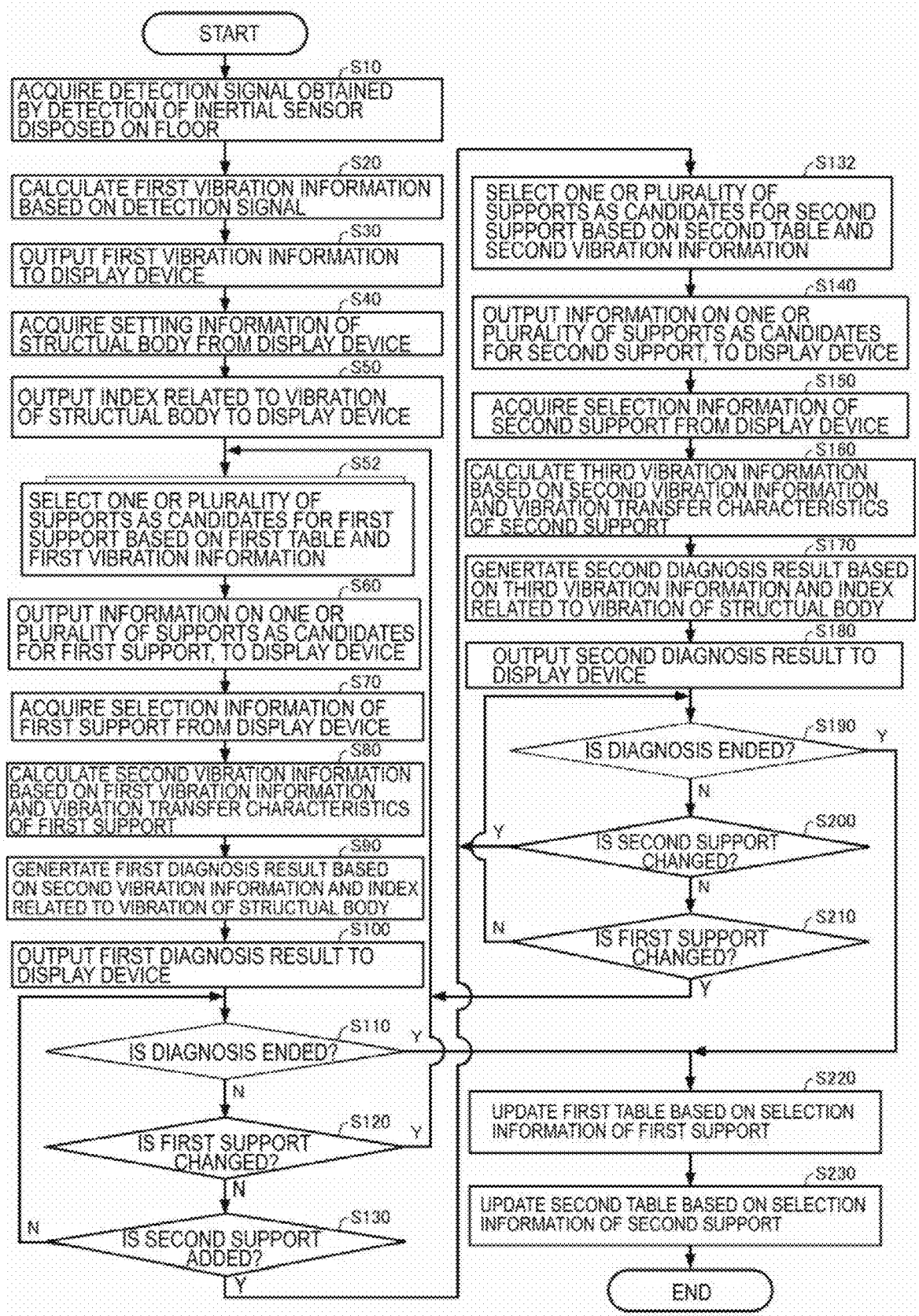
FIG. 33 is a flowchart illustrating an example of a procedure of a diagnostic method in the third embodiment.

FIG. 33 is a flowchart illustrating an example of a procedure of a diagnostic method performed by the diagnostic device 2 in the third embodiment. In FIG. 33, the same steps as those in FIG. 24 or 29 are denoted by the same reference signs, and the description thereof will be omitted.

In the procedure illustrated in FIG. 33, Steps S220 and S230 are added to the procedure illustrated in FIG. 29.

First, when the diagnostic device 2 performs the processes of Steps S10 to S100 in order, and then the user does not perform an operation to end the diagnosis in Step S110 but performs an operation to request the change of the first support in Step S120, the diagnostic device 2 performs the process of Step S52 and the subsequent processes again. When the user does not perform the operation to end the diagnosis in Step S110 but performs an operation to add a second support in Step S130, the diagnostic device 2 performs the processes of Steps S132 to S180 in order.

Then, when the user does not perform the operation to end the diagnosis in Step S190 but performs the operation to request the change of the second support in Step S200, the diagnostic device 2 performs the process of Step S132 and the subsequent processes again. When the user does not perform the operation to end the diagnosis in Step S190 but performs the operation to change the first support in Step S210, the diagnostic device 2 performs the process of Step S52 and the subsequent processes again.

When the user performs the operation to end the diagnosis in Step S110, or performs the operation to end the diagnosis in Step S190, the diagnostic device 2 updates the first table based on the selection information of the first support, which is acquired from the display device 3 in Step S70, in Step S220. Specifically, when the first support selected by the user is different from all of the one or plurality of supports as the candidates for the first support, which are output to the display device 3 in Step S60, the diagnostic device 2 updates the first table. When the diagnostic device 2 acquires the selection information of the first support a plurality of times, the diagnostic device 2 may update the first table based on the selection information of the first support, which is acquired last.

Then, in Step S230, the diagnostic device 2 updates the second table based on the selection information of the second support, which is acquired from the display device 3 in Step S150, and ends the diagnostic processing. Specifically, when the second support selected by the user is different from all of the one or plurality of supports as the candidates for the second support, which are output to the display device 3 in Step S140, the diagnostic device 2 updates the second table. When the diagnostic device 2 acquires the selection information of the second support a plurality of times, the diagnostic device 2 may update the second table based on the selection information of the second support, which is acquired last.

FIG. 34 is a flowchart illustrating an example of a procedure of a display method performed by the display device 3 in the third embodiment. In FIG. 34, the same steps as those in FIG. 25 are denoted by the same reference signs, and the description thereof will be omitted.

A procedure of the display method performed by the display device 3 in the third embodiment is similar to that in FIG. 25, and thus the illustration and description thereof will be omitted.

According to the third embodiment described above, it is possible to exhibit effects similar to those in the second embodiment.

In the third embodiment, when the support different from all of the one or plurality of supports as the candidates for the first support is selected as the first support by the user, the diagnostic device 2 updates the first table for defining the correspondence between the vibration level, the value of the index related to the vibration of the structural body 6, and the one or plurality of supports as the candidates for the first support. Therefore, according to the third embodiment, the correspondence between the vibration level, the index value, and the candidate of the first support is updated by the first support selected by the user. Thus, it is possible to present one or a plurality of more appropriate supports as candidates for the first support, based on the updated correspondence, in the next diagnosis.

Further, in the third embodiment, when the support different from all of the one or plurality of supports as the candidates for the second support is selected as the second support by the user, the diagnostic device 2 updates the second table for defining the correspondence between the vibration level, the value of the index related to the vibration of the structural body 6, and the one or plurality of supports as the candidates for the second support. Thus, according to the third embodiment, the correspondence between the vibration level, the value of the index, and the candidates for the second support is updated by the second support selected by the user. Thus, it is possible to present one or a plurality of supports more appropriate as the candidates for the second support, based on the updated correspondence, in the next diagnosis.

The present disclosure is not limited to the present embodiment, and various modifications can be made within the scope of the gist of the present disclosure.

The above-described embodiments and modifications are merely examples, and the present disclosure is not limited to the above description. For example, the embodiments and the modifications can be combined as appropriate.

The present disclosure includes a configuration substantially the same as the configuration described in the embodiment, for example, a configuration having the same functions, methods, and results, or a configuration having the same purpose and effects. The present disclosure also includes a configuration in which a not-essential portion of the configuration described in the embodiments is replaced. The present disclosure also includes a configuration of exhibiting the same effects as the configuration described in the embodiments or a configuration capable of achieving the same object. Further, the present disclosure includes a configuration in which a known technique is added to the configuration described in the embodiments.

The following contents are derived from the embodiments and modifications described above.

According to one aspect, a diagnostic method includes calculating first vibration information related to a vibration of a floor based on a detection signal obtained by detection of an inertial sensor disposed on the floor, generating a first diagnosis result related to vibration damping on a structural body when a first support is installed between the floor and the structural body, based on the first support selected based on the calculated first vibration information, an index related to a vibration of the structural body, and information displayed on a display device, and outputting the generated first diagnosis result to the display device.

In this diagnostic method, the display device displays the first diagnosis result related to vibration damping on the structural body when the first support selected by the user based on the information displayed on the display device is installed between the floor and the structural body. Thus, according to this diagnostic method, the user can determine whether or not the level of the vibration transferred to the structural body when the first support is selected may be allowable, based on the first diagnosis result.

In one aspect, in the diagnostic method, the first support may be a stiff support.

According to this diagnostic method, the first diagnosis result related to vibration damping on the structural body when the stiff support selected as the first support is installed between the floor and the structural body is obtained. Thus, the user can determine whether or not the stiff support selected as the first support is appropriate, based on the first diagnosis result. Further, the user can determine whether or not it is necessary to reduce the vibration transferred to the structural body by further installing a vibration isolation frame.

In one aspect, the diagnostic method may further include selecting one or a plurality of supports as candidates for the first support, based on a first table and the first vibration information, the first table being for defining a correspondence between a vibration level, a value of the index, and the one or plurality of supports as the candidates for the first support, and outputting information on the selected one or plurality of supports as the candidates for the first support, to the display device.

According to this diagnostic method, it is possible to present, to the user, one or a plurality of supports appropriate as the candidates for the first support, based on the relation between the first vibration information related to the vibration of the floor and the index related to the vibration of the structural body.

In one aspect, the diagnostic method may further include updating the first table when a support different from all of the one or plurality of supports as the candidates for the first support is selected as the first support.

According to this diagnostic method, the correspondence between the vibration level, the value of the index, and the candidates for the first support is updated by the first support selected by the user. Thus, it is possible to present one or a plurality of supports more appropriate as the candidates for the first support, based on the updated correspondence, in the next diagnosis.

In one aspect in the diagnostic method, the first diagnosis result may include a graph in which the index and second vibration information related to a vibration on the structural body when the first support is installed between the floor and the structural body are plotted.

According to this diagnostic method, the user can easily compare the index related to the vibration of the structural body with the level of the vibration transferred to the structural body, based on the visualized graph, and can easily recognize the optimum support as the first support.

In one aspect, the diagnostic method may further include calculating the second vibration information based on the first vibration information and vibration transfer characteristics of the first support, which are prepared in advance, and generating the first diagnosis result based on the calculated second vibration information.

According to this diagnostic method, the first diagnosis result can be obtained based on the vibration transfer characteristics of the first support, which are prepared in advance. Thus, the user can determine whether or not the level of the vibration transferred to the structural body can be allowed, without actually measuring the vibration transferred to the structural body in a state where the first support is installed between the floor and the structural body.

In one aspect, the diagnostic method may further include generating a second diagnosis result related to vibration damping on the structural body when the first support and a second support are installed between the floor and the structural body, based on the second support selected based on the calculated second vibration information, the index, and information displayed on the display device, and outputting the generated second diagnosis result to the display device.

In this diagnostic method, the display device displays the second diagnosis result related to vibration damping on the structural body when the first support and the second support selected by the user based on the information displayed on the display device is installed between the floor and the structural body. Thus, according to this diagnostic method, the user can determine whether or not the level of the vibration transferred to the structural body when the first support and the second support are selected may be allowable, based on the second diagnosis result.

In one aspect in the diagnostic method, the second support may be a vibration isolation frame.

According to this diagnostic method, the second diagnosis result related to vibration damping on the structural body when the vibration isolation frame selected as the second support is installed between the floor and the structural body together with the first support is obtained. Thus, the user can determine whether or not the support selected as the first support and the vibration isolation frame selected as the second support are appropriate, based on the second diagnosis result.

In one aspect, the diagnostic method may further include selecting one or a plurality of supports as candidates for the second support, based on a second table and the second vibration information, the second table being for defining a correspondence between a vibration level, a value of the index, and the one or plurality of supports as the candidates for the second support, and outputting information on the selected one or plurality of supports as the candidates for the second support, to the display device.

According to this diagnostic method, it is possible to present, to the user, one or a plurality of supports appropriate as the candidates for the second support, based on the relation between the second vibration information related to the vibration on the structural body when the first support is installed between the floor and the structural body, and the index related to the vibration of the structural body.

In one aspect, the diagnostic method may further include updating the second table when a support different from all of the one or plurality of supports as the candidates for the second support is selected as the second support.

According to this diagnostic method, the correspondence between the vibration level, the value of the index, and the candidates for the second support is updated by the second support selected by the user. Thus, it is possible to present one or a plurality of supports more appropriate as the candidates for the second support, based on the updated correspondence, in the next diagnosis.

In one aspect in the diagnostic method, the second diagnosis result may include a graph in which the index and third vibration information related to a vibration on the structural body when the first support and the second support are installed between the floor and the structural body are plotted.

According to this diagnostic method, the user can easily compare the index related to the vibration of the structural body with the level of the vibration transferred to the structural body, based on the visualized graph, and can easily recognize the optimum support as the first support and the optimum support as the second support.

In one aspect, the diagnostic method may further include calculating the third vibration information based on the second vibration information and vibration transfer characteristics of the second support, which are prepared in advance, and generating the second diagnosis result based on the calculated third vibration information.

According to this diagnostic method, the second diagnosis result can be obtained based on the vibration transfer characteristics of the second support, which are prepared in advance. Thus, the user can determine whether or not the level of the vibration transferred to the structural body can be allowed, without actually measuring the vibration transferred to the structural body in a state where the first support and the second support are installed between the floor and the structural body.

According to another aspect, a diagnostic system includes a diagnostic device, and a display device. The diagnostic device includes a first vibration information calculation unit that calculates first vibration information related to a vibration of a floor based on a detection signal obtained by detection of an inertial sensor disposed on the floor, a first diagnosis result generation unit that generates a first diagnosis result related to vibration damping on a structural body when a first support is installed between the floor and the structural body, based on the first support selected based on the calculated first vibration information, an index related to a vibration of the structural body, and information displayed on the display device, and an output unit that outputs the generated first diagnosis result to the display device. The display device displays the first diagnosis result.

In this diagnostic system, the display device displays the first diagnosis result related to vibration damping on the structural body when the first support selected by the user based on the information displayed on the display device is installed between the floor and the structural body. Thus, according to this diagnostic system, the user can determine whether or not the level of the vibration transferred to the structural body when the first support is selected may be allowable, based on the first diagnosis result.

According to still another aspect, a display method includes displaying information for selecting a first support, and displaying a first diagnosis result related to vibration damping on a structural body when the first support is installed between a floor and the structural body, the first diagnosis result being generated based on the first support selected based on first vibration information related to a vibration of the floor calculated based on a detection signal obtained by detection of an inertial sensor disposed on the floor, an index related to a vibration of the structural body, and the information.

In this display method, the first diagnosis result related to vibration damping on the structural body when the first support selected by the user based on the displayed information is installed between the floor and the structural body is displayed. Thus, according to this display method, the user can determine whether or not the level of the vibration transferred to the structural body when the first support is selected may be allowable, based on the first diagnosis result.

What is claimed is:

1. A diagnostic method for causing a processor to execute a program stored in a memory, the diagnostic method comprising executing on the processor the steps of:
    causing an inertial sensor to detect values relating to an acceleration and an angular velocity of a vibration of a building floor so as to generate a detection signal, the inertial sensor being disposed at the building floor;
    calculating first vibration information related to the vibration of the building floor based on the detection signal, the first vibration information including information of frequencies and magnitudes of the vibration of the building floor;
    performing a vibration diagnosis with respect to a structural body of a diagnosis model based on the calculated first vibration information, an index related to a vibration of the structural body, and information displayed on a display device, wherein the index is a standard of the vibration allowed for the structural body, and the displayed information identifies a plurality of supports that are candidates for a first support for being installed between the building floor and the structural body;
    generating a second diagnosis result related to vibration damping on the structural body when the first support and a second support are installed between the building floor and the structural body, based on the second support selected based on second vibration information, the index, and information displayed on the display device, the second vibration information being related to a vibration on the structural body when the first support is installed between the building floor and the structural body;
    selecting one or a plurality of supports as candidates for the second support, based on a second table and the second vibration information, the second table being for defining a correspondence between a vibration level, a value of the index, and the one or plurality of supports as the candidates for the second support;
    outputting a first diagnosis result of the vibration diagnosis and the generated second diagnosis result to the display device; and
    outputting information on the selected one or plurality of supports as the candidates for the second support, to the display device,
    wherein the first diagnosis result includes a graph in which the index and the second vibration information are plotted.

2. The diagnostic method according to claim 1, wherein the first support is a stiff support.

3. The diagnostic method according to claim 1, further comprising:
    selecting one or more supports of the plurality of supports as the candidates for the first support, based on a first table and the first vibration information, the first table being for defining a correspondence between a vibration level, a value of the index, and the one or more supports of the plurality of supports as the candidates for the first support; and
    outputting information on the selected one or more supports of the plurality of supports as the candidates for the first support, to the display device.

4. The diagnostic method according to claim 3, further comprising:
    updating the first table when a support different from all of the one or more supports of the plurality of supports as the candidates for the first support is selected as the first support.

5. The diagnostic method according to claim 1, further comprising:
    calculating the second vibration information based on the first vibration information and vibration transfer characteristics of the first support, which are prepared in advance; and
    generating the first diagnosis result based on the calculated second vibration information.

6. The diagnostic method according to claim 1, wherein the second support is a vibration isolation frame.

7. The diagnostic method according to claim 1, further comprising:
    updating the second table when a support different from all of the one or plurality of supports as the candidates for the second support is selected as the second support.

8. The diagnostic method according to claim 1, wherein the second diagnosis result includes a graph in which the index and third vibration information related to a vibration on the structural body when the first support and the second support are installed between the building floor and the structural body are plotted.

9. The diagnostic method according to claim 8, further comprising:
    calculating the third vibration information based on the second vibration information and vibration transfer characteristics of the second support, which are prepared in advance; and
    generating the second diagnosis result based on the calculated third vibration information.

10. A diagnostic method for causing a processor to execute a program stored in a memory, the diagnostic method comprising executing on the processor the steps of:

causing an inertial sensor to detect values relating to an acceleration and an angular velocity of a vibration of an installation location so as to generate a detection signal, the inertial sensor being disposed at the installation location;

calculating first vibration information related to the vibration of the installation location based on the detection signal, the first vibration information including information of frequencies and magnitudes of the vibration of the installation location;

generating a first diagnostic result based on a first support selected from candidates, and the first vibration information, wherein the first diagnostic result is related to vibration damping on a structural body when the first support is installed between the installation location and the structural body;

generating a second diagnosis result related to vibration damping on the structural body when the first support and a second support are installed between the installation location and the structural body, based on the second support selected based on second vibration information, an index related to a vibration of the structural body, and information displayed on a display device, the second vibration information being related to a vibration on the structural body when the first support is installed between the installation location and the structural body;

selecting one or a plurality of supports as candidates for the second support, based on a table and the second vibration information, the table being for defining a correspondence between a vibration level, a value of the index, and the one or plurality of supports as the candidates for the second support; and outputting information on the selected one or plurality of supports as the candidates for the second support, to the display device, wherein the first diagnosis result includes a graph in which the index and the second vibration information are plotted.

11. A diagnostic system comprising:

a display device; and a diagnostic device, the diagnostic device including:
an inertial sensor configured to detect values relating to an acceleration and an angular velocity of a vibration of a building floor so as to generate a detection signal, the inertial sensor being disposed at the building floor;
a memory configured to store a program; and
a processor configured to execute the program so as to:
calculate first vibration information related to the vibration of the building floor based on the detection signal, the first vibration information including information of frequencies and magnitudes of the vibration of the building floor;
perform a vibration diagnosis with respect to a structural body of a diagnosis model based on the calculated first vibration information, an index related to a vibration of the structural body, and information displayed on a display device, wherein the index is a standard of the vibration allowed for the structural body, and the displayed information identifies a plurality of supports that are candidates for a first support for being installed between the building floor and the structural body;
generate a second diagnosis result related to vibration damping on the structural body when the first support and a second support are installed between the building floor and the structural body, based on the second support selected based on second vibration information, the index, and information displayed on the display device, the second vibration information being related to a vibration on the structural body when the first support is installed between the building floor and the structural body;
select one or a plurality of supports as candidates for the second support, based on a second table and the second vibration information, the second table being for defining a correspondence between a vibration level, a value of the index, and the one or plurality of supports as the candidates for the second support;
output a first diagnosis result of the vibration diagnosis and the generated second diagnosis result to the display device; and
output information on the selected one or plurality of supports as the candidates for the second support, to the display device, wherein the display device displays the first diagnosis result and the generated second diagnosis result, and the first diagnosis result includes a graph in which the index and the second vibration information are plotted.

12. A display method comprising:

displaying information for selecting a first support on a display device; and displaying a first diagnosis result related to vibration damping on a structural body when the first support is installed between a building floor and the structural body on the display device, the first diagnosis result being generated based on the first support selected based on first vibration information related to a vibration of the building floor calculated based on a detection signal obtained by an inertial sensor disposed at the building floor, an index related to a vibration of the structural body, and the displayed information, wherein the inertial sensor is configured to detect values relating to an acceleration and an angular velocity of a vibration of the building floor so as to generate the detection signal, the index is a standard of the vibration allowed for the structural body, and the displayed information identifies a plurality of supports that are candidates for the first support, a second diagnosis result related to vibration damping on the structural body, when the first support and a second support are installed between the building floor and the structural body, is generated based on the second support selected based on second vibration information, the index, and information displayed on the display device, and the second vibration information is related to a vibration on the structural body when the first support is installed between the building floor and the structural body, one or a plurality of supports is selected as candidates for the second support, based on a table and the second vibration information, and the table is for defining a correspondence between a vibration level, a value of the index, and the one or plurality of supports as the candidates for the second support, information on the selected one or plurality of supports as the candidates for the second support is output to the display device, and the first diagnosis result includes a graph in which the index and the second vibration information are plotted.

* * * * *